(12) United States Patent
Toyama

(10) Patent No.: US 8,203,794 B2
(45) Date of Patent: Jun. 19, 2012

(54) VARIABLE MAGNIFICATION OPTICAL SYSTEM AND IMAGING APPARATUS

(75) Inventor: Nobuaki Toyama, Saitama (JP)

(73) Assignee: Fujifilm Corporation, Tokyo (JP)

( * ) Notice: Subject to any disclaimer, the term of this patent is extended or adjusted under 35 U.S.C. 154(b) by 52 days.

(21) Appl. No.: 12/951,574

(22) Filed: Nov. 22, 2010

(65) Prior Publication Data

US 2011/0128633 A1 Jun. 2, 2011

(30) Foreign Application Priority Data

Nov. 27, 2009 (JP) ................................ 2009-269916

(51) Int. Cl.
*G02B 15/14* (2006.01)
*H04N 5/225* (2006.01)
(52) U.S. Cl. ...................... 359/682; 359/691; 348/340
(58) Field of Classification Search .................. 348/335, 348/340; 359/680, 682, 683, 684, 691
See application file for complete search history.

(56) References Cited

U.S. PATENT DOCUMENTS

| | | | |
|---|---|---|---|
| 6,967,783 B2 * | 11/2005 | Noda | 359/691 |
| 7,050,240 B2 | 5/2006 | Tomioka | |
| 7,167,318 B2 * | 1/2007 | Tomioka | 359/682 |
| 7,277,232 B2 * | 10/2007 | Sato | 359/682 |
| 7,907,351 B2 * | 3/2011 | Tomioka | 359/691 |
| 2011/0128632 A1 * | 6/2011 | Toyama | 359/682 |
| 2011/0279906 A1 * | 11/2011 | Komatsu | 359/680 |

* cited by examiner

*Primary Examiner* — David N Spector
(74) *Attorney, Agent, or Firm* — Young & Thompson

(57) ABSTRACT

A variable magnification optical system includes first-lens-group having negative refractive power, aperture stop, and second-lens-group having positive refractive power, arranged from the object-side. An aspheric lens, a central portion of the object-side surface of which is convex, is arranged on the most object-side of the second-lens-group. The object-side surface of the aspheric lens is formed in such a manner that positive power decreases from the central portion of the object-side surface of the aspheric lens toward the periphery thereof, or that an inflection point is present between the central portion and the periphery and positive power decreases as a distance from the central portion increases between the central portion and the inflection point, and negative power increases toward the periphery between the inflection point and the periphery. The aspheric surface satisfies the following formulas (1) and (2) about refractive index and Abbe number:

$Ne5 < 1.53$  (1); and $vd5 > 75$  (2).

6 Claims, 26 Drawing Sheets

FIG.2
EXAMPLE 1
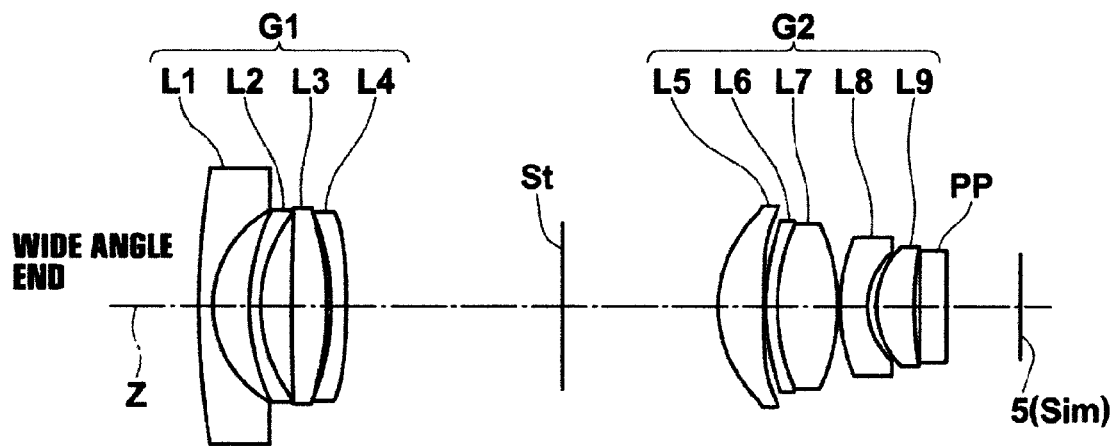
WIDE ANGLE END
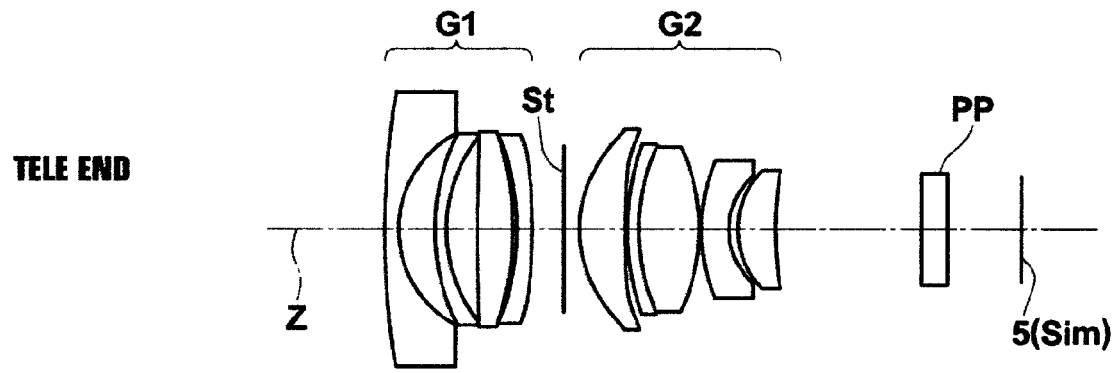
TELE END

FIG.3
EXAMPLE 2
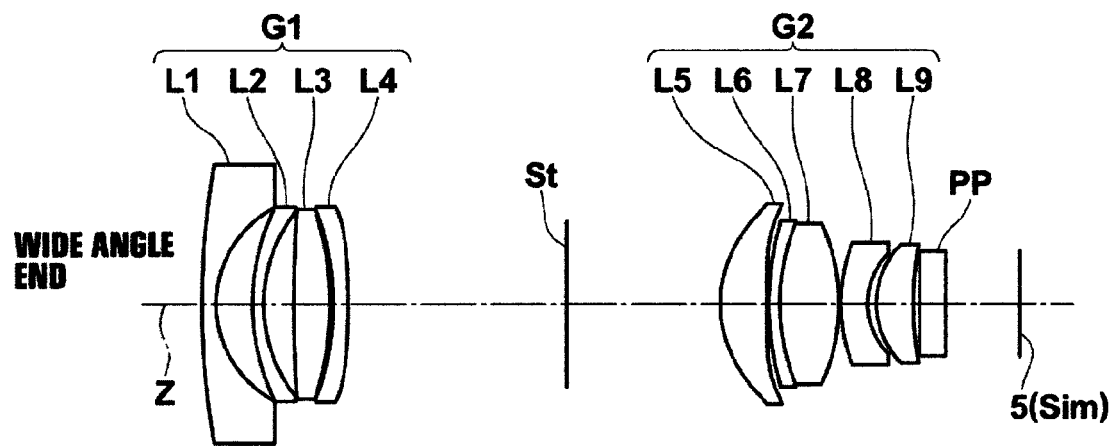
WIDE ANGLE END
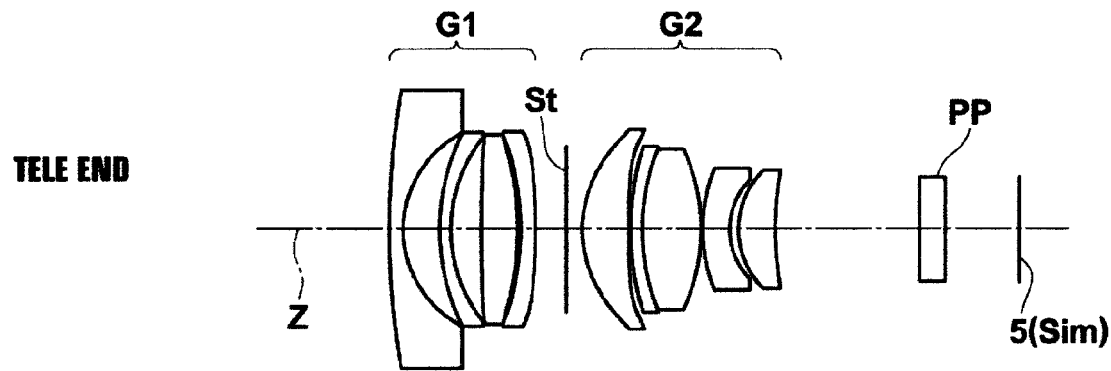
TELE END

FIG.4
EXAMPLE 3
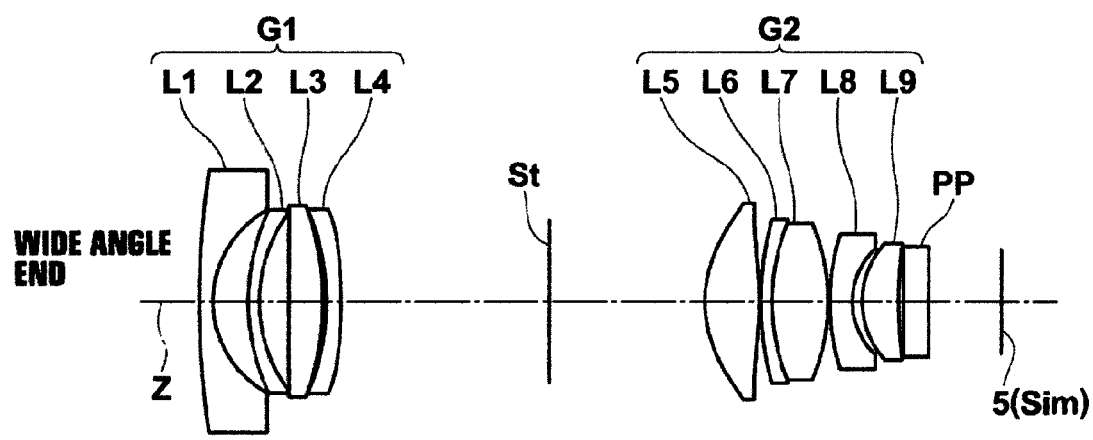
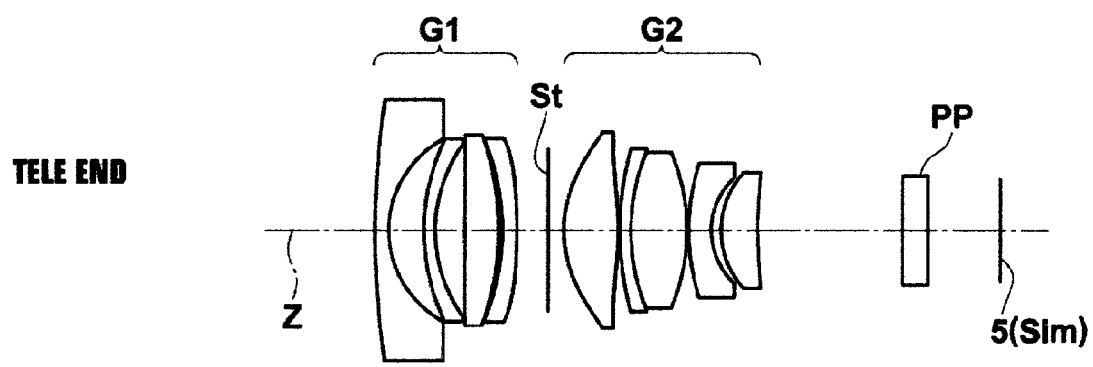

FIG.5
EXAMPLE 4
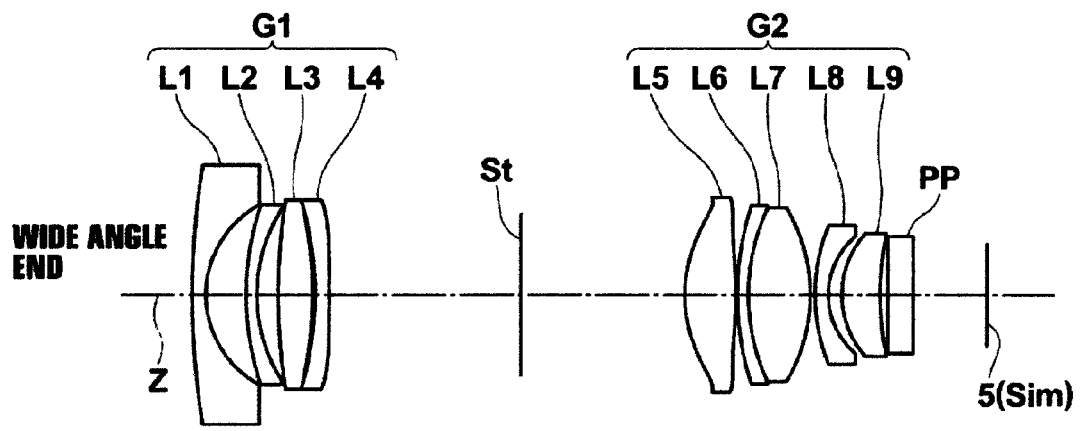
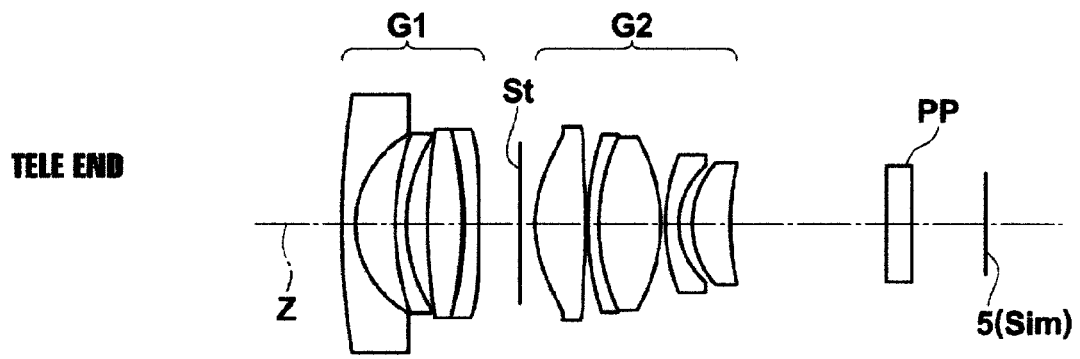

FIG.6
EXAMPLE 5
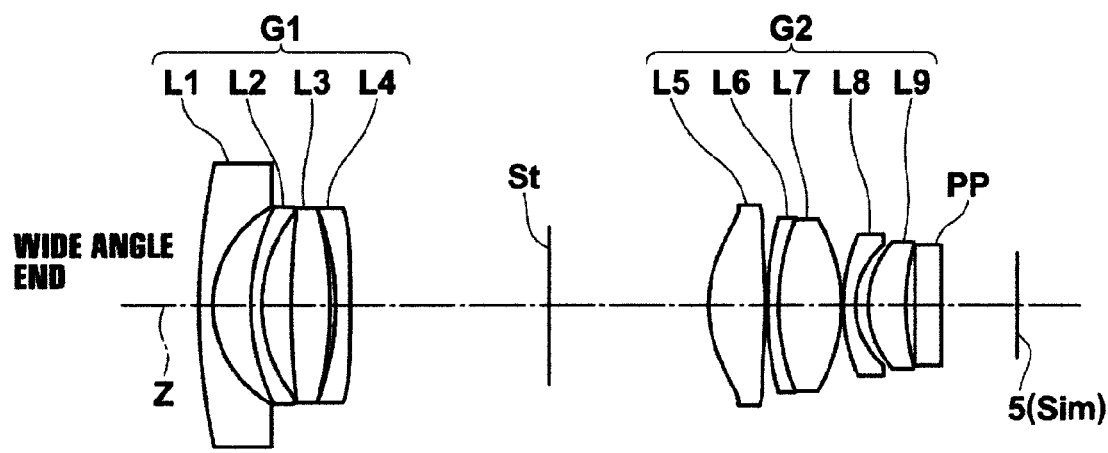
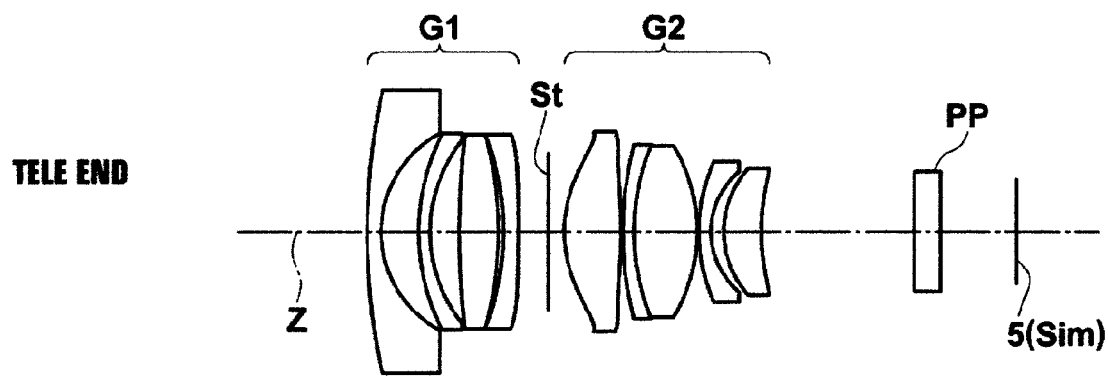

FIG.7
EXAMPLE 6
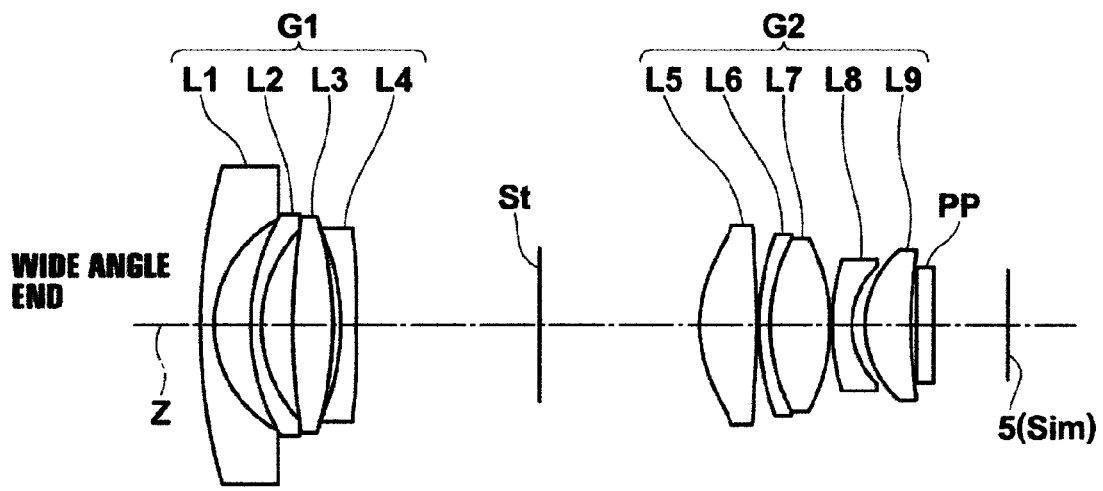
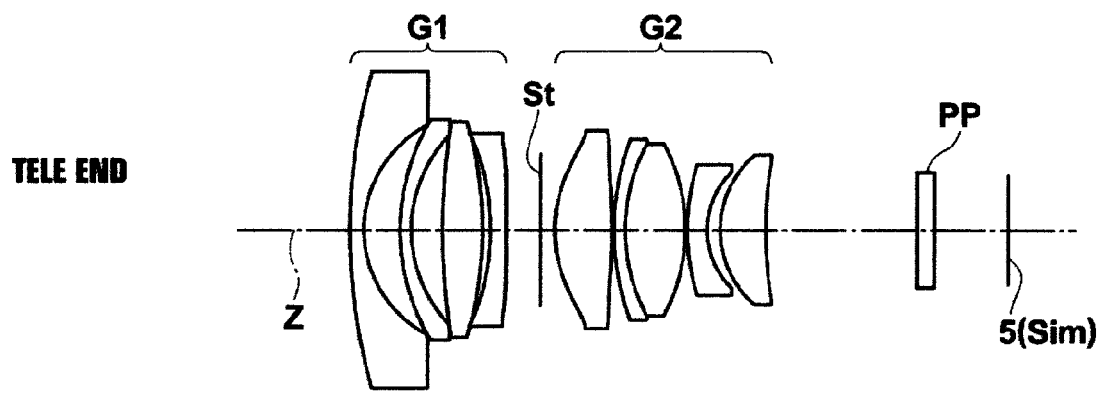

EXAMPLE 1

WIDE ANGLE END

TELE END

EXAMPLE 1 (WIDE ANGLE END)
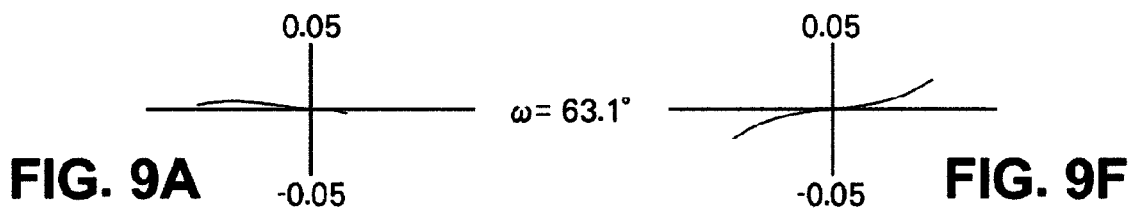
FIG. 9A   ω= 63.1°   FIG. 9F
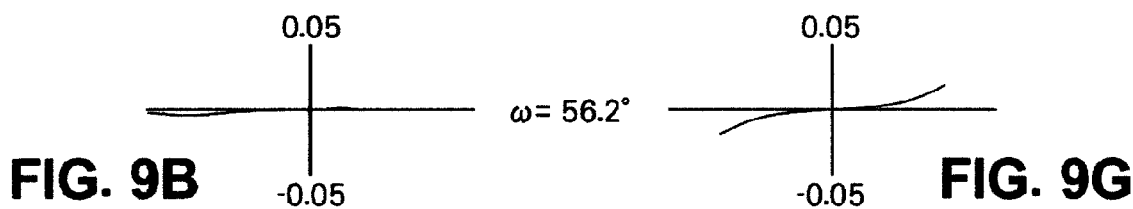
FIG. 9B   ω= 56.2°   FIG. 9G
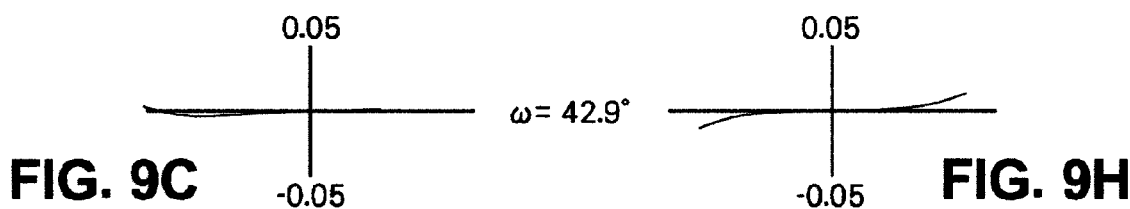
FIG. 9C   ω= 42.9°   FIG. 9H
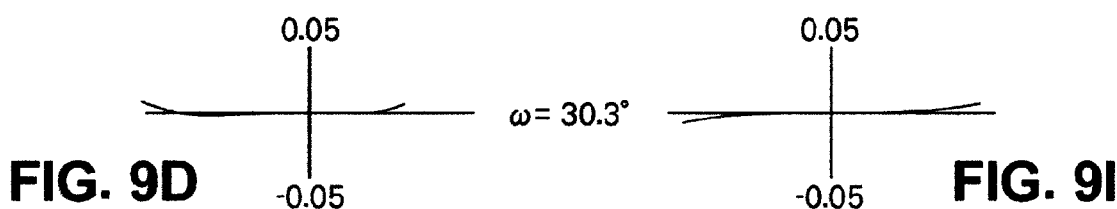
FIG. 9D   ω= 30.3°   FIG. 9I
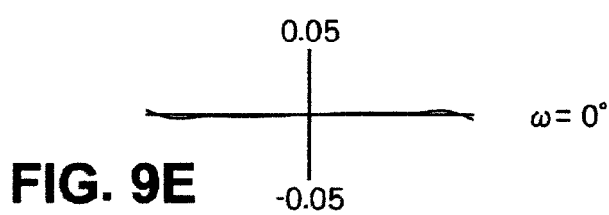
FIG. 9E   ω= 0°

EXAMPLE 1 (TELE END)

FIG. 10A  $\omega = 17.2°$  FIG. 10F

FIG. 10B  $\omega = 15.5°$  FIG. 10G

FIG. 10C  $\omega = 12.1°$  FIG. 10H

FIG. 10D  $\omega = 8.6°$  FIG. 10I

FIG. 10E  $\omega = 0°$

EXAMPLE 2
WIDE ANGLE END
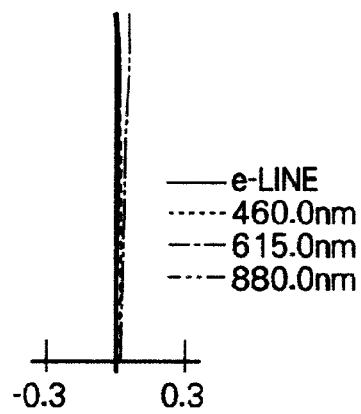
FIG. 11A — Spherical Aberration (Fno.=1.35)
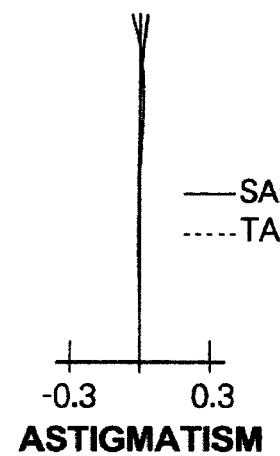
FIG. 11B — Astigmatism (ω=62.7°)
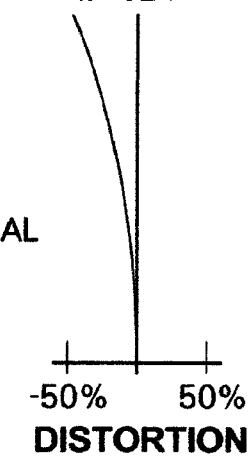
FIG. 11C — Distortion (ω=62.7°)
TELE END
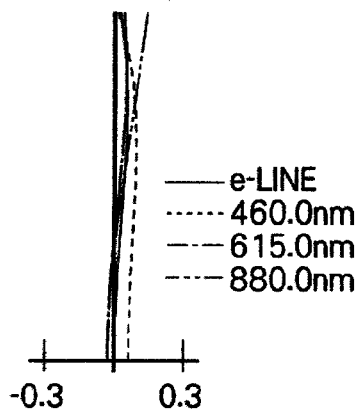
FIG. 11D — Spherical Aberration (Fno.=2.93)
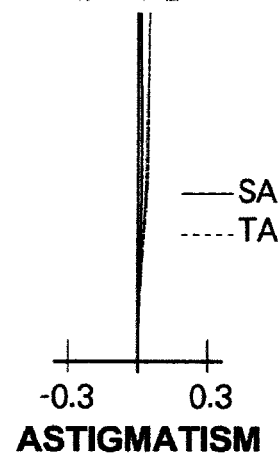
FIG. 11E — Astigmatism (ω=17.2°)
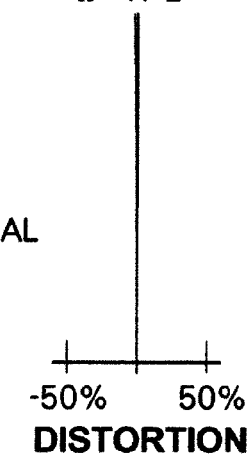
FIG. 11F — Distortion (ω=17.2°)

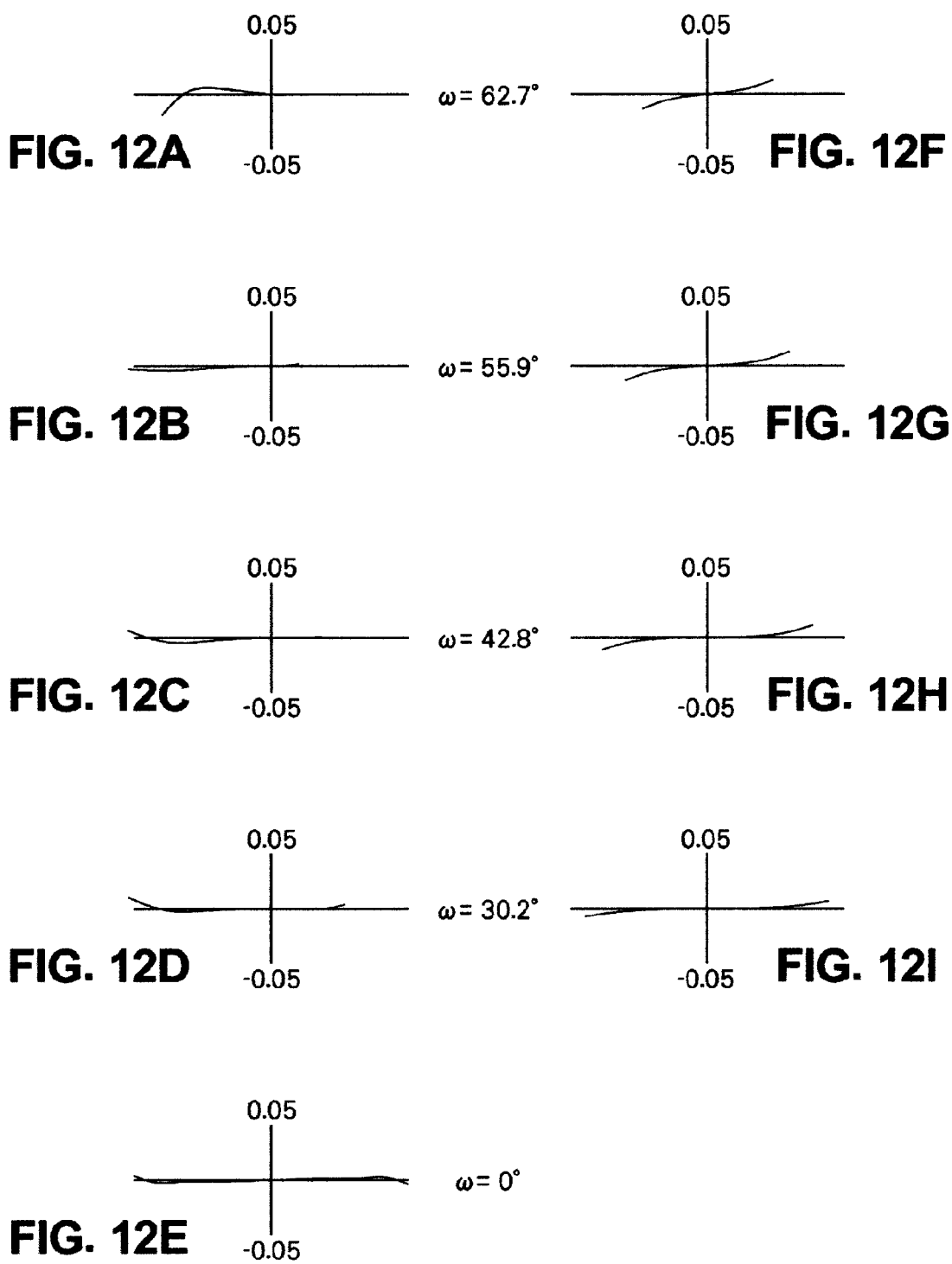

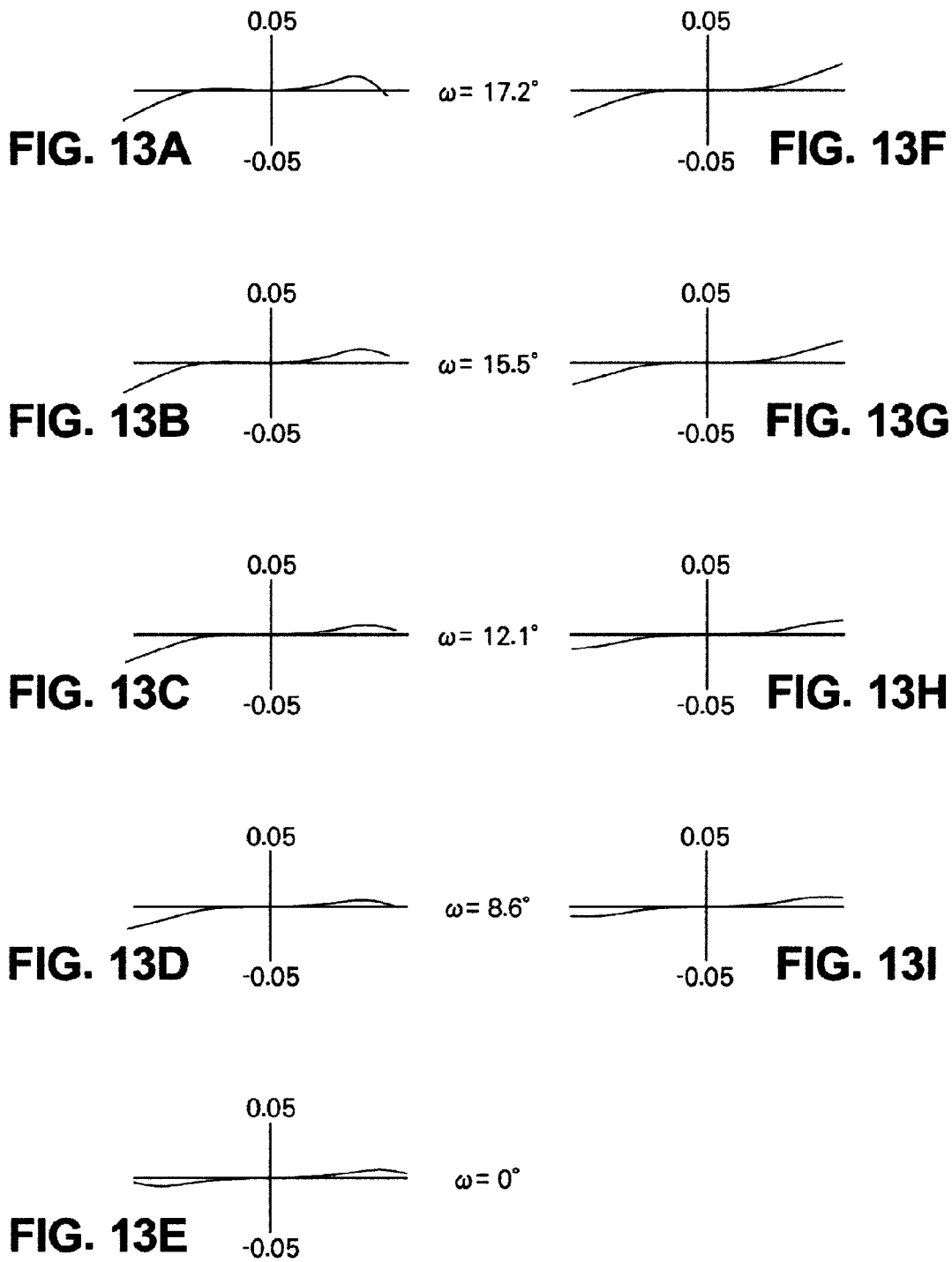

EXAMPLE 3

WIDE ANGLE END

SPHERICAL ABERRATION

ASTIGMATISM

DISTORTION

TELE END

SPHERICAL ABERRATION

ASTIGMATISM

DISTORTION

EXAMPLE 3 (WIDE ANGLE END)
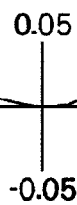
FIG. 15A    ω = 63.3°        
FIG. 15B    ω = 56.3°        
FIG. 15C    ω = 43°        
FIG. 15D    ω = 30.3°        
FIG. 15E    ω = 0°

EXAMPLE 3 (TELE END)
FIG. 16A  ω= 17.2°
FIG. 16F
FIG. 16B  ω= 15.5°
FIG. 16G
FIG. 16C  ω= 12.1°
FIG. 16H
FIG. 16D  ω= 8.7°
FIG. 16I
FIG. 16E  ω= 0°

EXAMPLE 4

WIDE ANGLE END

TELE END

EXAMPLE 4 (WIDE ANGLE END)
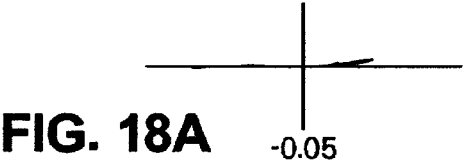
FIG. 18A   ω = 64.4°
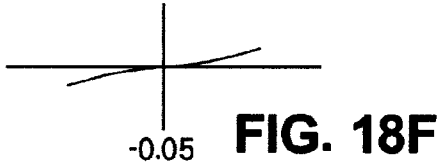
FIG. 18F
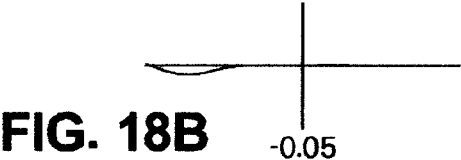
FIG. 18B   ω = 57°
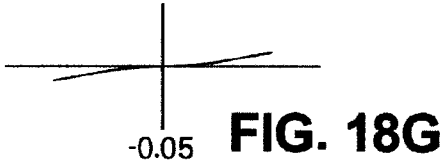
FIG. 18G
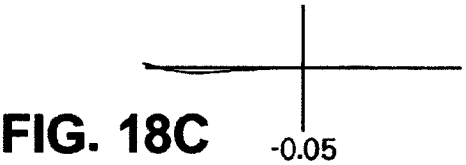
FIG. 18C   ω = 43.3°
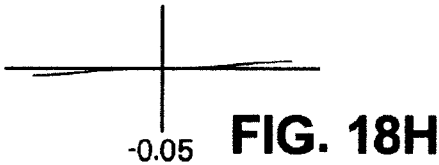
FIG. 18H
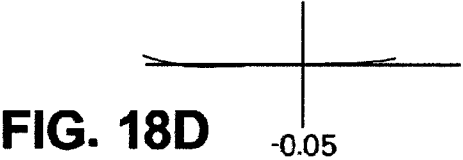
FIG. 18D   ω = 30.4°
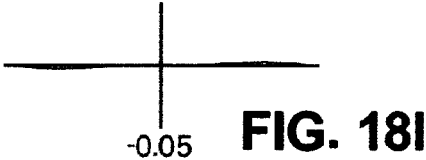
FIG. 18I
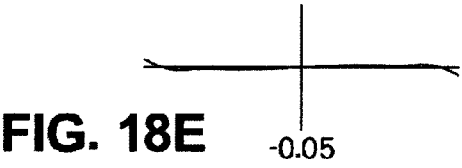
FIG. 18E   ω = 0°

EXAMPLE 4 (TELE END)
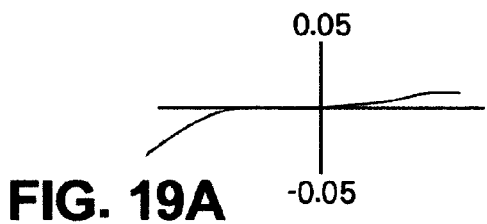
FIG. 19A  ω = 17.3°
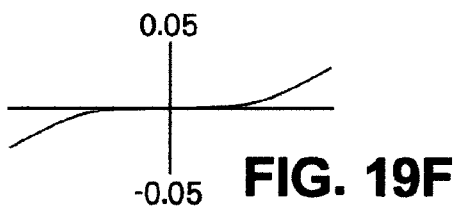
FIG. 19F
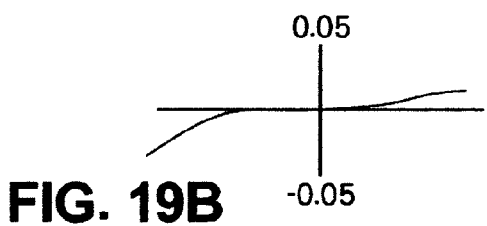
FIG. 19B  ω = 15.5°
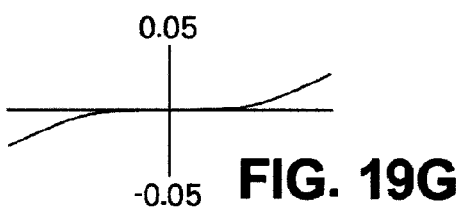
FIG. 19G
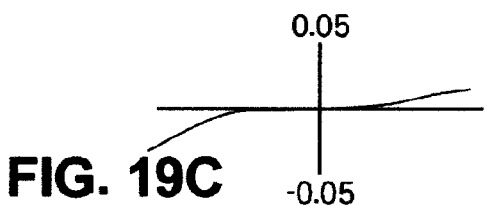
FIG. 19C  ω = 12.1°
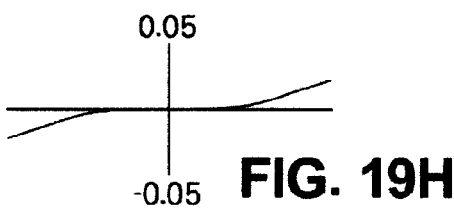
FIG. 19H
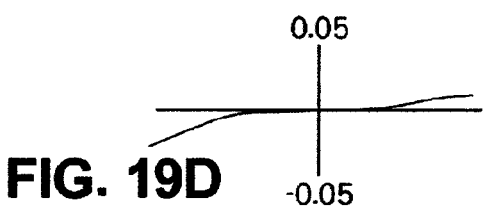
FIG. 19D  ω = 8.7°
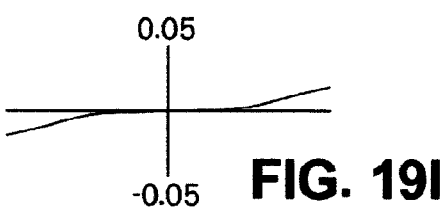
FIG. 19I
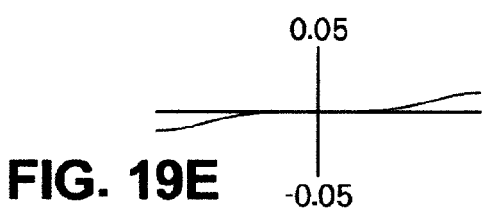
FIG. 19E  ω = 0°

EXAMPLE 5

WIDE ANGLE END

TELE END

EXAMPLE 5 (WIDE ANGLE END)

EXAMPLE 5 (TELE END)
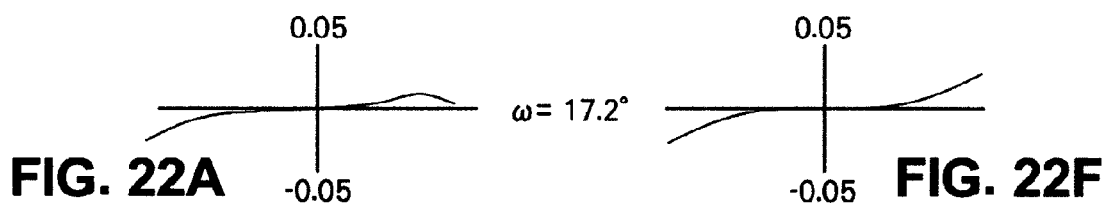
FIG. 22A  ω= 17.2°  FIG. 22F
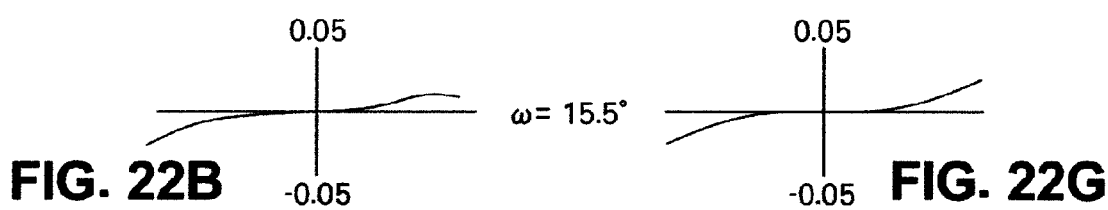
FIG. 22B  ω= 15.5°  FIG. 22G
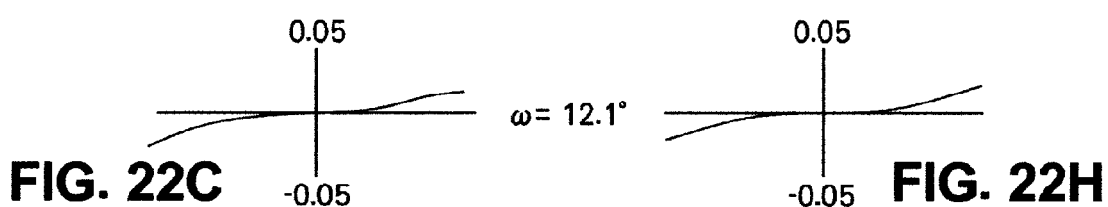
FIG. 22C  ω= 12.1°  FIG. 22H
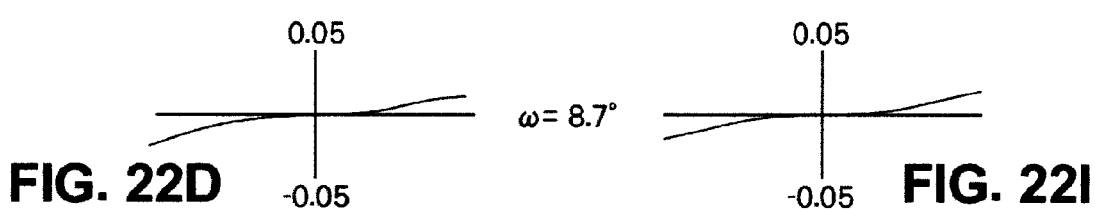
FIG. 22D  ω= 8.7°  FIG. 22I
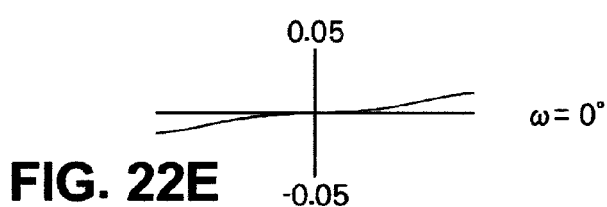
FIG. 22E  ω= 0°

EXAMPLE 6

WIDE ANGLE END

Fno.=1.35
— e-LINE
---- 460.0nm
-·- 615.0nm
--- 880.0nm
-0.3  0.3
SPHERICAL ABERRATION

ω=68.6°
— SAGITTAL
---- TANGENTIAL
-0.3  0.3
ASTIGMATISM

ω=68.6°
-50%  50%
DISTORTION

TELE END

Fno.=3.05
— e-LINE
---- 460.0nm
-·- 615.0nm
--- 880.0nm
-0.3  0.3
SPHERICAL ABERRATION

ω=18.1°
— SAGITTAL
---- TANGENTIAL
-0.3  0.3
ASTIGMATISM

ω=18.1°
-50%  50%
DISTORTION

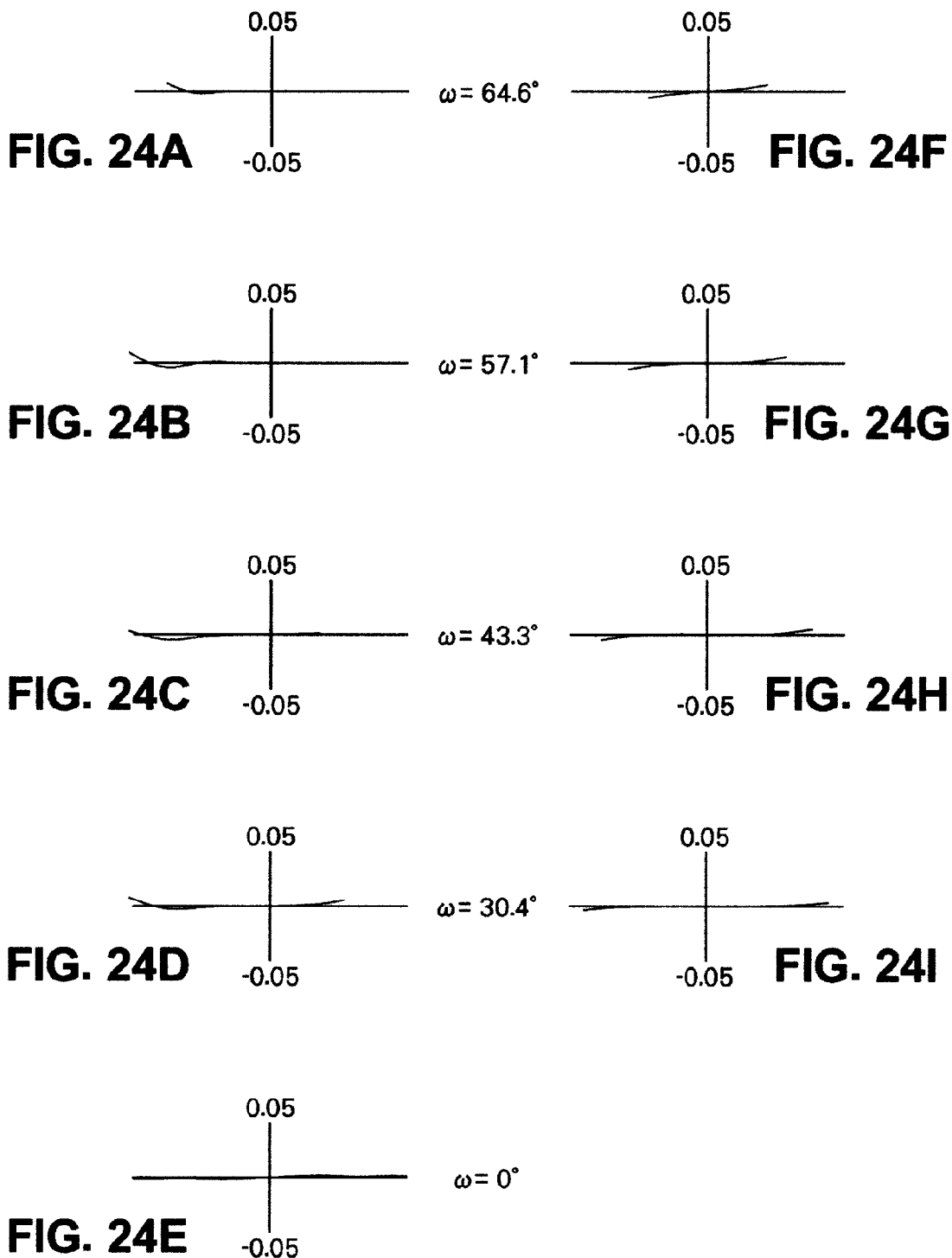

EXAMPLE 6 (TELE END)
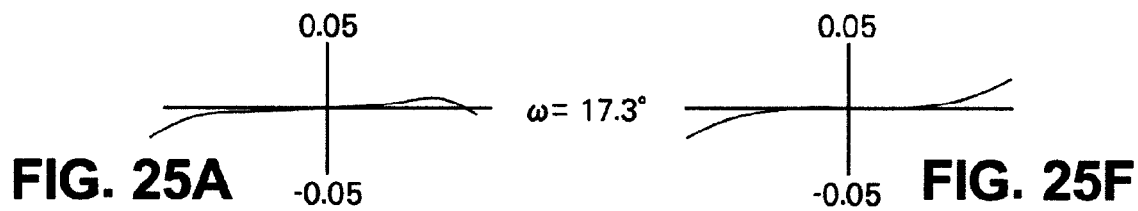
FIG. 25A ω= 17.3° FIG. 25F
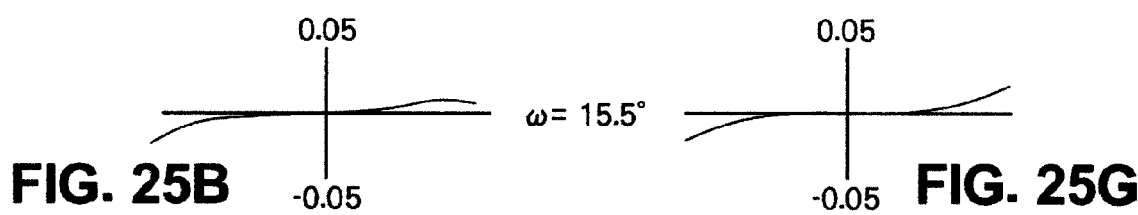
FIG. 25B ω= 15.5° FIG. 25G
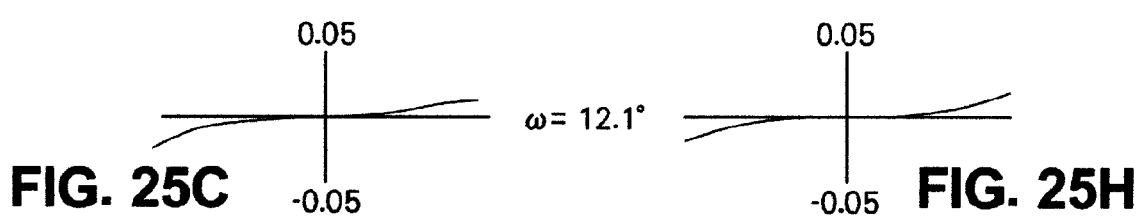
FIG. 25C ω= 12.1° FIG. 25H
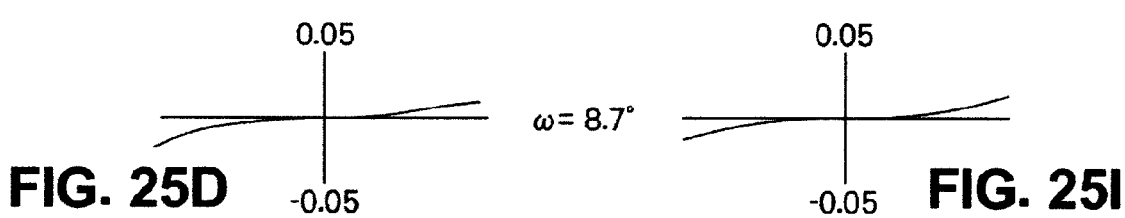
FIG. 25D ω= 8.7° FIG. 25I
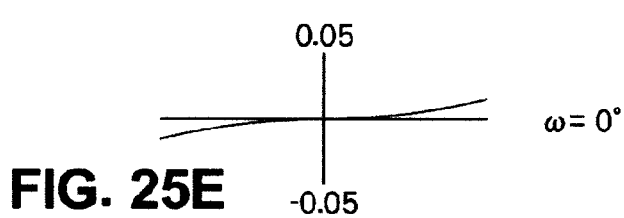
FIG. 25E ω= 0°

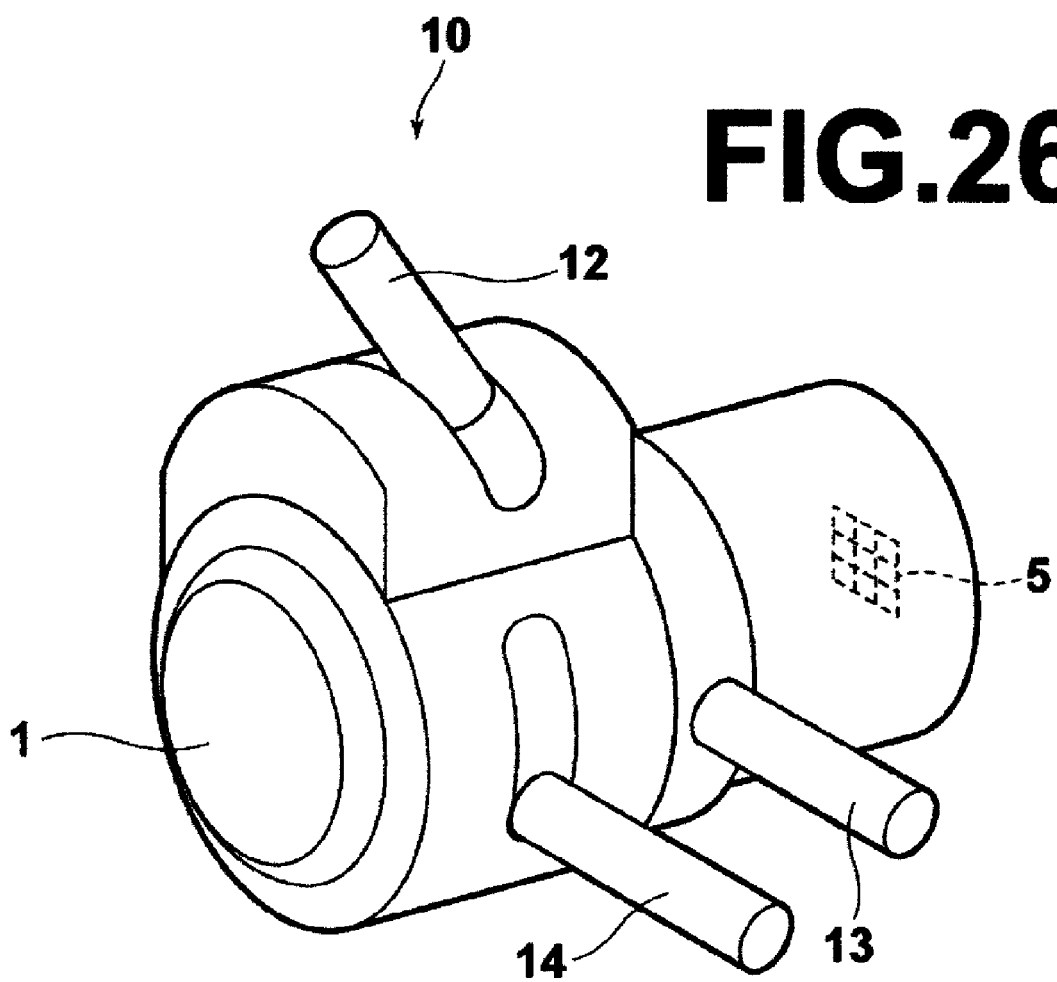

VARIABLE MAGNIFICATION OPTICAL SYSTEM AND IMAGING APPARATUS

BACKGROUND OF THE INVENTION

1. Field of the Invention

The present invention relates to a variable magnification optical system and an imaging apparatus that are used in a video camera, an electronic still camera and the like. In particular, the present invention relates to a variable magnification optical system that is appropriate for use in a monitor camera, and which is usable for both of a visible light range and a near-infrared light range. Further, the present invention relates to an imaging apparatus including the variable magnification optical system.

2. Description of the Related Art

Conventionally, monitor cameras are used to prevent crimes, to record images, or the like. Optical systems for the monitor cameras need to be small and at low cost. The optical systems need to have large aperture ratios so that subjects are identified even in low-illumination photography conditions, as well as having high optical performance. Further, a demand for monitor cameras with variable magnification functions increased in recent years. Naturally, the main trend of optical systems for monitor cameras will be variable magnification optical systems. The variable magnification optical system that can be used in monitor cameras is disclosed, for example, in U.S. Pat. No. 7,167,318 (Patent Document 1). The variable magnification optical system disclosed in Patent Document 1 is a two-group zoom optical system composed of a first lens group having a negative refractive power and a second lens group having a positive refractive power. In the variable magnification optical system disclosed in Patent Document 1, each of the first lens group and the second lens group is composed of three lenses. Therefore, the variable magnification optical system disclosed in Patent Document 1 is compact.

Meanwhile, a monitor camera performs photography by visible light during day time, and performs photography by near-infrared light during night time or after dark in many cases. Therefore, the monitor camera needs to cope with both of a visible light range and a near-infrared light range. Therefore, a lens system of the monitor camera needs to be structured in such a manner that chromatic aberrations are corrected in an excellent manner for the range including visible light through near-infrared light. As a variable magnification optical system that can be used for both of the visible light range and the near-infrared light range, a variable magnification optical system disclosed in U.S. Pat. No. 7,050,240 (Patent Document 2) is known. The variable magnification optical system disclosed in Patent Document 2 has two-group zoom structure, and each of the first lens group and the second lens group of the variable magnification optical system is composed of four lenses. Further, aberrations are corrected in an excellent manner for both of the visible light range and the near-infrared light range.

Meanwhile, imaging devices, such as a CCD (Charge Coupled Device) and a CMOS (Complementary Metal Oxide Semiconductor), are mounted on cameras in the aforementioned fields. In recent years, the resolution of the imaging devices became higher, and a demand for high-quality images or video images by use of monitor cameras increased. Especially, a demand for high-performance variable magnification optical systems that can cope with imaging devices having pixel numbers of 1 million or higher is increasing. However, in conventional optical systems, it was difficult to achieve high-performance optical systems that can cope with the increase in resolution in recent years, while the large aperture ratio and the compactness (small size or the like), which are necessary for use in monitor cameras, are maintained.

SUMMARY OF THE INVENTION

In view of the foregoing circumstances, it is an object of the present invention to provide a variable magnification optical system having a high optical performance that can cope with the increase of resolution in recent years while the large aperture ratio and the compactness of the optical system are maintained, and which is usable for both of a visible light range and a near-infrared light range. Further, it is another object of the present invention to provide an imaging apparatus including the variable magnification optical system.

A variable magnification optical system of the present invention is a variable magnification optical system comprising:

a first lens group having negative refractive power;

an aperture stop; and a second lens group having positive refractive power, which are sequentially arranged from the object side of the variable magnification optical system, wherein the magnification of the variable magnification optical system is changed by changing an interval between the first lens group and the second lens group in the direction of an optical axis, and the position of an image plane is corrected by moving the first lens group in the direction of the optical axis when correction of the position of the image plane becomes necessary by changing the magnification, and wherein the second lens group includes an aspheric lens that is arranged on the most object side of the second lens group, and the object-side surface of the aspheric lens being an aspheric surface and a central portion of the aspheric surface being in convex form, a cemented lens composed of two lenses, a negative lens having a concave surface facing the image side of the variable magnification optical system, and a positive lens having a convex surface facing the object side of the variable magnification optical system, which are sequentially arranged from the object side of the variable magnification optical system, and wherein one of the two lenses of the cemented lens is a positive lens and the other one of the cemented lens is a negative lens, and wherein the object-side surface of the aspheric lens in the second lens group is formed in such a manner that positive power decreases from a central portion of the object-side surface of the aspheric lens toward the periphery of the object-side surface of the aspheric lens, or in such a manner that an inflection point is present between the central portion of the object-side surface of the aspheric lens and the periphery of the object-side surface of the aspheric lens, and that the positive power decreases as a distance from the central portion increases between the central portion and the inflection point, and that negative power increases toward the periphery between the inflection point and the periphery, and wherein when the refractive index of the aspheric lens in the second lens group for e-line and the Abbe number of the aspheric lens for d-line are Ne5 and νd5, respectively, the following formulas (1) and (2) are satisfied:

$$Ne5 < 1.53 \quad (1); \text{ and}$$

$$\nu d5 > 75 \quad (2).$$

The expressions "one of the two lenses of the cemented lens is a positive lens and the other one of the cemented lens is a negative lens", "negative lens having a concave surface facing the image side", and "positive lens having a convex surface facing the object side" refer to paraxial regions when the lenses are aspheric.

Further, power at a point on a surface may be represented by (N2−N1)/R, when the length of a segment connecting the point and an intersection between the normal to the surface at the point and the optical axis (the intersection, at which the normal to the surface at the point and the optical axis intersect each other) is curvature radius R, and the refractive index of the object side of the surface is N1, and the refractive index of the image side of the surface is N2. At this time, the sign of the curvature radius R (positive or negative) is positive when the intersection is located on the image side of the surface. The curvature radius R is negative when the intersection is located on the object side of the surface.

The term "central portion" refers to a portion or region in the vicinity of an optical axis. Further, the term "periphery" refers to a region within an effective diameter. Therefore, a region on the outside of the effective diameter is not included. In the present invention, the "effective diameter" of a surface is determined by the height of outermost rays of rays included in an axial beam and an off-axial beam, when the axial beam and the off-axial beam enter the maximum aperture based on the specification of the optical system. The specification is an F-number, the angle of view, the image height, and the like. Further, the specification may include the aperture of a diaphragm that cuts predetermined rays.

In the variable magnification optical system of the present invention, when the paraxial focal length of the aspheric lens in the second lens group is f5 and the focal length of the second lens group is fG2, it is desirable that the following formula (3) is satisfied:

$$1.05 < f5/fG2 < 1.65 \qquad (3).$$

In the variable magnification optical system of the present invention, when the refractive index of the negative lens having the concave surface facing the image side of the variable magnification optical system in the second lens group for e-line is Ne8, it is desirable that the following formula (4) is satisfied:

$$Ne8 > 1.95 \qquad (4).$$

In the variable magnification optical system of the present invention, when the Abbe number of the positive lens included in the cemented lens in the second lens group for d-line is νd7, it is desirable that the following formula (5) is satisfied:

$$\nu d7 > 75 \qquad (5).$$

In the variable magnification optical system of the present invention, it is desirable that the aperture stop is fixed when the magnification is changed.

An imaging apparatus according to the present invention includes the variable magnification optical system of the present invention.

According to the present invention, a variable magnification optical system includes a first lens group having negative refractive power, an aperture stop, and a second lens group having positive refractive power, which are sequentially arranged from the object side of the variable magnification optical system. Further, the magnification of the variable magnification optical system is changed by changing an interval between the first lens group and the second lens group in the direction of an optical axis, and the position of an image plane is corrected by moving the first lens group in the direction of the optical axis when correction of the position of the image plane becomes necessary by changing the magnification. In the variable magnification optical system, the structure of the second lens group is set in an appropriate manner. In particular, an aspheric lens is arranged on the most object side of the second lens group (closest to the object side among lenses of the second lens group), and the form and the material of the aspheric lens is appropriately set. Therefore, the variable magnification optical system is usable for both of a visible light range and a near-infrared light range. Further, it is possible to realize a variable magnification optical system that has high optical performance to cope with the increase of resolution in recent years, while the compactness and the large aperture ratio are maintained.

Further, the imaging apparatus of the present invention includes the variable modification optical system of the present invention. Therefore, imaging apparatus of the present invention may be used for both of the visible light range and the near-infrared light range. Further, the imaging apparatus has excellent compactness, and can perform photography (imaging) at low illumination. Further, it is possible to obtain high-quality images.

BRIEF DESCRIPTION OF THE DRAWINGS

FIG. 2 is a cross-section illustrating the lens structure of a variable magnification optical system in Example 1 of the present invention;

FIG. 3 is a cross-section illustrating the lens structure of a variable magnification optical system in Example 2 of the present invention;

FIG. 4 is a cross-section illustrating the lens structure of a variable magnification optical system in Example 3 of the present invention;

FIG. 5 is a cross-section illustrating the lens structure of a variable magnification optical system in Example 4 of the present invention;

FIG. 6 is a cross-section illustrating the lens structure of a variable magnification optical system in Example 5 of the present invention;

FIG. 7 is a cross-section illustrating the lens structure of a variable magnification optical system in Example 6 of the present invention;

FIGS. 9A through 9I are diagrams illustrating lateral aberrations of the variable magnification optical system in Example 1 of the present invention at wide angle end;

FIGS. 10A through 10I are diagrams illustrating lateral aberrations of the variable magnification optical system in Example 1 of the present invention at tele end;

FIGS. 11A through 11F are diagrams illustrating longitudinal aberrations of the variable magnification optical system in Example 2 of the present invention;

FIGS. 12A through 12I are diagrams illustrating lateral aberrations of the variable magnification optical system in Example 2 of the present invention at wide angle end;

FIGS. 13A through 13I are diagrams illustrating lateral aberrations of the variable magnification optical system in Example 2 of the present invention at tele end;

FIGS. 15A through 15I are diagrams illustrating lateral aberrations of the variable magnification optical system in Example 3 of the present invention at wide angle end;

FIGS. 16A through 16I are diagrams illustrating lateral aberrations of the variable magnification optical system in Example 3 of the present invention at tele end;

FIGS. 18A through 18I are diagrams illustrating lateral aberrations of the variable magnification optical system in Example 4 of the present invention at wide angle end;

FIGS. 19A through 19I are diagrams illustrating lateral aberrations of the variable magnification optical system in Example 4 of the present invention at tele end;

FIGS. 21A through 21I are diagrams illustrating lateral aberrations of the variable magnification optical system in Example 5 of the present invention at wide angle end;

FIGS. 22A through 22I are diagrams illustrating lateral aberrations of the variable magnification optical system in Example 5 of the present invention at tele end;

FIGS. 24A through 24I are diagrams illustrating lateral aberrations of the variable magnification optical system in Example 6 of the present invention at wide angle end;

FIGS. 25A through 25I are diagrams illustrating lateral aberrations of the variable magnification optical system in Example 6 of the present invention at tele end; and FIG. 26 is a schematic diagram illustrating a perspective view of an imaging apparatus according to an embodiment of the present invention.

DESCRIPTION OF THE PREFERRED EMBODIMENTS

Figure 1:
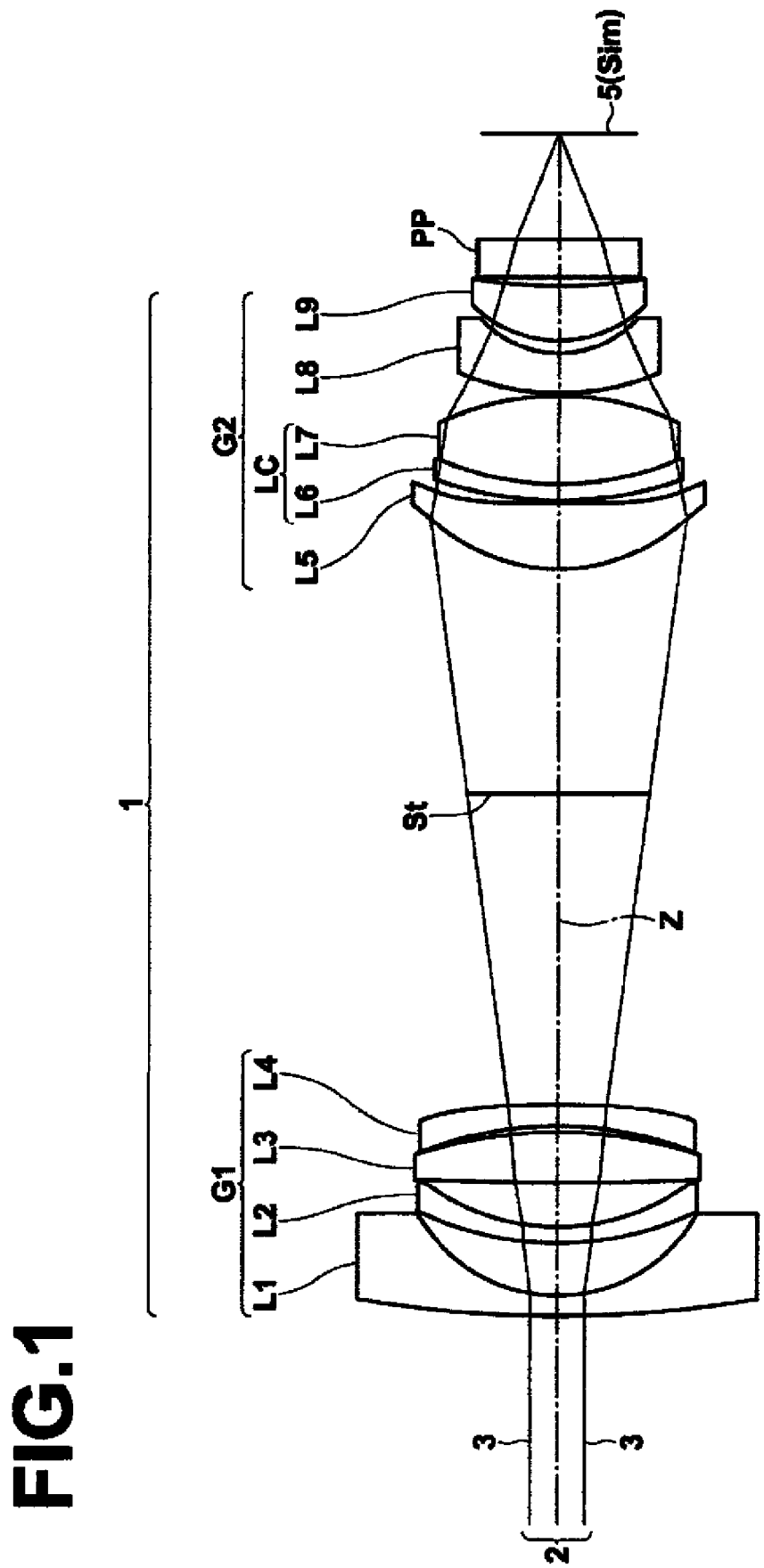
FIG. 1 is a cross-section illustrating the structure of a variable magnification optical system according to an embodiment of the present invention and an optical path of an axial beam.

Hereinafter, embodiments of the present invention will be described, in detail, with reference to drawings. FIG. 1 is a cross-section illustrating an example of the structure of a variable magnification optical system 1 according to an embodiment of the present invention. The variable magnification optical system 1 illustrated in FIG. 1 corresponds to the variable magnification optical system in Example 1, which will be described later. In FIG. 1, the left side is the object side, and the right side is the image side. FIG. 1 illustrates also an axial beam 2 from an object located at infinity.

The variable magnification optical system 1 includes first lens group G1 having negative refractive power, aperture stop St, and second lens group G2 having positive refractive power, which are arranged along optical axis Z from the object side of the variable magnification optical system. The magnification of the variable magnification optical system 1 is changed between a wide angle end and a tele end by changing an interval between the first lens group G1 and the second lens group G2 in the direction of an optical axis. Further, the position of an image plane is corrected by moving the first lens group G1 in the direction of the optical axis Z when correction of the position of the image plane becomes necessary by changing the magnification. In the example illustrated in FIG. 1, the aperture stop St is fixed when the magnification is changed. In FIG. 1, the aperture stop St does not necessarily represent the form nor the size of the aperture stop St, but the position of the aperture stop ST on the optical axis Z. When the first lens group has negative power, in other words, a lens group having negative power is located on the object side or leading side, the lens system is appropriate for realizing a wide angle of view. Further, it is relatively easy to maintain sufficient backfocus.

Considering a case of applying the variable magnification optical system 1 to an imaging apparatus, FIG. 1 illustrates an imaging device 5, which is arranged on image plane Sim of the variable magnification optical system 1. When the variable magnification optical system 1 is applied to the imaging apparatus, it is desirable that a cover glass, a prism, an infrared-ray cut filter, a low-pass filter, or the like is provided based on the structure of a camera onto which the lens is mounted. Therefore, FIG. 1 illustrates a case in which parallel-flat-plate-form optical member PP, which assumes these elements, is arranged between the second lens group G2 and the imaging device 5.

The first lens group G1 of the variable magnification optical system of the present invention may be composed of four lenses that are sequentially arranged from the object side, for example, as illustrated in FIG. 1. The four lenses arranged from the object side are negative lens L1 having a concave surface facing the image side, negative lens L2 having a concave surface facing the image side, positive lens L3 having a convex surface facing the image side, and negative lens L4 having a concave surface facing the object side. When the first lens group G1 is structured in such a manner, it is possible to easily realize a high-performance variable magnification optical system in which coma aberration and field curvature are reduced, while the size of the variable magnification optical system is reduced.

Specifically, in the example illustrated in FIG. 1, the lens L1 is a meniscus lens having a convex surface facing the object side, and the lens L2 is a meniscus lens having a convex surface facing the object side. The lens L3 is a double convex (convex-convex) lens, and the lens L4 is a meniscus lens having a convex surface facing the image side in the paraxial region. Two negative meniscus lenses, namely the lenses L1 and L2, are arranged, it is possible to distribute negative power required by the first lens group G1 to the two lenses. Further, it is possible to easily correct coma aberration and field curvature in an excellent manner.

It is desirable that the lens L4 in the first lens group G1 is an aspheric lens having an aspheric surface facing the image side, as illustrated in the example of FIG. 1. When the aspheric lens is arranged on the most image side of the first lens group G1, as described above, it is possible correct coma aberration in an excellent manner. Further, it is possible to easily realize a small high-performance optical system.

Further, it is desirable that the aspheric surface on the image side of the lens L4 is structured in such a manner that a region on the outside (the side or direction away from the optical axis) of positions through which outermost rays 3 of the axial beam 2 pass includes a portion the positive power of which is higher than power in the vicinity of the optical axis. When the aspheric surface on the image side of the lens L4 is structured in such a manner, it is possible to correct off-axial aberration, and particularly coma aberration in an excellent manner. Therefore, it is possible to easily realize a small high-performance optical system that has high resolution. The image-side surface of the lens L4 may be formed, for example, in such a manner that positive power increases from the optical axis toward the periphery of the surface. Alternatively, the image-side surface of the lens L4 may be formed in such a manner that only a part of a region on the outside of positions through which outermost rays 3 pass has positive power that is higher than the power in the vicinity of the optical axis.

Further, the object-side surface of the lens L4 may be also aspheric. When the object-side surface of the lens L4 is also aspheric, it is possible to further improve the performance of the lens L4.

In the variable magnification optical system of the present invention, the lens L5 that has an aspheric surface facing the object side, and a central portion of the aspheric surface being convex, is arranged on the most object side of the lens group G2. Further, the object-side surface of the lens L5 is formed in such a manner that positive power decreases from the central portion of the object-side surface of the lens L5 toward the periphery of the objective-side surface of the lens L5. Alternatively, the object-side surface of the lens L5 is formed in such a manner that an inflection point is present between the central portion of the object-side surface of the lens L5 and the periphery of the object-side surface of the lens L5, and that the positive power decreases as a distance from the central portion increases between the central portion and the inflection point, and that negative power increases toward the periphery between the inflection point and the periphery. The inflection point is a point at which the sign of the curvature changes.

The most object-side lens L5 of the second lens group G2 is an aspheric lens, and the form of the object-side surface of the lens L5 is formed as described above. Therefore, it is possible to reduce spherical aberration. Further, it is possible to obtain a large aperture ratio, for example, corresponding to F-number of approximately 1.3, which is required by a monitor camera or the like. Further, it is possible to achieve high performance, while structuring the optical system in small size.

Further, when the refractive index of the lens L5 for e-line and the Abbe number of the lens L5 for d-line are Ne5 and νd5, respectively, it is desirable that the following formulas (1) and (2) are satisfied:

$$Ne5 < 1.53 \quad (1); \text{ and}$$

$$\nu d5 > 75 \quad (2).$$

When a material that satisfies the formulas (1) and (2) is selected from optical materials that are currently available (usable), it is possible to select a material having a high anomalous dispersion characteristic. Further, it is possible to reduce longitudinal chromatic aberration in addition to correcting spherical aberration in an excellent manner. For example, it is possible to realize a variable magnification optical system that is usable in both of the wavelength band of visible light range (approximately 400 nm to 700 nm) and the wavelength band of near-infrared light range (approximately 700 nm to 1000 nm).

The second lens group G2 of the variable magnification optical system 1 includes the lens L5, which is structured as described above, cemented lens LC, which is formed by cementing two lenses together, negative lens L8 having a concave surface facing the image side, and positive lens L9 having a convex surface facing the object side, which are sequentially arranged from the object side. One of the two lenses of the cemented lens LC is a positive lens, and the other one of the two lenses is a negative lens. In the example illustrated in FIG. 1, the cemented lens LC of the second lens group G2 includes the negative lens L6 and the positive lens L7, which are sequentially arranged from the object side. Alternatively, the negative lens and the positive lens in the cemented lens LC may be arranged in reverse order. Further, when reduction in the size of the variable magnification optical system is important, it is desirable that the second lens group G2 has five-lens structure composed of the aforementioned five lenses.

In addition to structuring the lens L5 as described above, when the second lens group G2 includes the cemented lens LC, the lens L8 and the lens L9 as described above, it is possible to suppress spherical aberration, coma aberration and field curvature. Therefore, it is possible to realize high optical performance that can cope with the increase in resolution of recent years, while maintaining the compactness of the optical system and the large aperture ratio.

In the example illustrated in FIG. 1, the second lens group G2 is composed of five lenses, namely, lens L5, cemented lens LC of lens L6 and lens L7, lens L8, and lens L9, which are sequentially arranged from the object side. Both surfaces of the lens L5 are aspheric, and the lens L5 has positive refractive power in the paraxial region. The lens L6 of the cemented lens LC has negative meniscus form, and the lens L7 of the cemented lens LC has double-convex form. The lens L8 has negative meniscus form having a convex surface facing the object side. The lens L9 has positive meniscus form having a convex surface facing the object side.

As described above, both surfaces of the lens L5, which is arranged on the most object side of the second lens group G2, are aspheric. Therefore, it is possible to correct spherical aberration in a more excellent manner, compared with the case of forming the aspheric surface only on a surface of the lens L5, while making dispersion light from the first lens group G1 that has negative refractive power converge. The structure including the cemented lens LC in the second lens group G2 is advantageous to correct chromatic aberrations. Therefore, it is possible to easily correct aberration in an excellent manner in a wide wavelength band including a visible light range through a near-infrared light range. Further, structuring both of the lens 8 and the lens L9, which are arranged on the image side of the second lens group G2, in meniscus form having a convex surface facing the object side is advantageous to correct field curvature in an excellent manner. Further, the structure that the two meniscus lenses arranged on the image side of the second lens group G2 are a negative lens and a positive lens is advantageous to correct various aberrations including spherical aberration and coma aberration.

In the variable magnification optical system 1, when the paraxial focal length of the lens L5 in the second lens group G2 is f5 and the focal length of the second lens group G2 is fG2, it is desirable that the following formula (3) is satisfied:

$$1.05 < f5/fG2 < 1.65 \quad (3).$$

The formula (3) relates to the ratio of power in the paraxial region of the lens L5 in the second lens group G2. When the value of f5/fG2 becomes lower than the lower limit of the formula (3), the power of the lens L5 in the paraxial region becomes too strong, and spherical aberration and coma aberration increase. When the value of f5/fG2 exceeds the upper limit of the formula (3), longitudinal chromatic aberration is not sufficiently corrected. When the lens L5 is structured so as to satisfy the formula (3), it is possible to realize a variable magnification optical system that has high optical performance, and that can be used in both of a visible light range and a near-infrared light range.

Further, it is more desirable that the following formula (3-2) is satisfied:

$$1.20 < f5/fG2 < 1.50 \quad (3\text{-}2).$$

When the formula (3-2) is satisfied, it is possible to further improve the effect achieved by satisfying the formula (3).

Further, in the variable magnification optical system 1, when the refractive index of the lens L8 of the second lens group G2 for e-line is Ne8, it is desirable that the following formula (4) is satisfied:

$$Ne8>1.95 \qquad (4).$$

When the lens L8 is structured so as to satisfy the formula (4), it is possible to reduce spherical aberration and coma aberration. Further, it is possible to realize a high-resolution optical system, while the large aperture ratio is maintained. Light that has passed through the lens L5 and the cemented lens LC of the second lens group G2 enters the lens L8 as convergence light. For the purpose of correcting aberrations in an excellent manner while the size of the optical system is reduced, it is desirable that the object-side surface of the lens L8 is in meniscus form having a convex surface facing the object side, as illustrated in FIG. 1, and that each of the object-side surface and the image-side surface of the lens L8 has strong power. However, if the absolute value of the curvature radius is reduced to increase the power of each surface of the lens L8, an aberration amount increases. Therefore, it is desirable that a material having a high refractive index is used as the material of the lens L8. Further, it is desirable that the formula (4) is satisfied.

In the variable magnification optical system 1, when the Abbe number of the positive lens included in the cemented lens LC of the second lens group G2 for d-line is vd7, it is desirable that the following formula (5) is satisfied:

$$vd7>75 \qquad (5).$$

When a material that satisfies the formula (5) is selected from optical materials that are currently available (usable), it is possible to select a material having a high anomalous dispersion characteristic. When such a material is selected as a material of the positive lens included in the cemented lens that is effective to correct chromatic aberrations, it is possible to reduce chromatic aberrations. Further, it is possible to realize a variable magnification optical system that is usable in both of a visible light range (approximately 400 nm to 700 nm) and a near-infrared light range (approximately 700 nm to 1000 nm). When the formula (5) is satisfied in addition to the formula (2), the second lens group G2 can include at least two lenses having high anomalous dispersion characteristics. Therefore, it is possible to achieve a higher chromatic aberration correction effect.

When the variable magnification optical system 1 is used in rough conditions, for example, such as outdoors, the material of the lens that is arranged on the most object side needs to be resistant to wind and rain, which damages the lens surface, and a change in temperature by direct sunlight. Further, the material needs to be resistant to chemicals, such as oil and fat, and detergent, in other words, the material needs to have high water-resistance, weather-resistance, acid-resistance, chemical-resistance, and the like. Further, the material needs to be hard and not easily breakable. Therefore, it is desirable that glass is used as the material of the most object-side lens. Alternatively, a transparent ceramic may be used.

When the variable magnification optical system 1 is used in rough conditions, not only the lens that is arranged on the most object-side but another lens or other lenses may be made of glass. Further, when the variable magnification optical system 1 is used in rough conditions, it is desirable that a multi-layer coating for protection is applied to the lens or lenses. Further, an anti-reflection coating for reducing ghost light during usage of the optical system may be provided, besides the multi-layer coating for protection.

In the example illustrated in FIG. 1, optical member PP is arranged between the lens system and the imaging plane. Instead of arranging various filters, such as a low-pass filter or a filter that cuts a specific wavelength band, between the lens system and imaging plane, these various filters may be arranged between lenses. Alternatively, a coating that acts similarly to the various filters may be applied to a lens surface of at least one of the lenses.

Next, examples of numerical values of the variable magnification optical system of the present invention will be described. FIGS. 2 through 7 are cross-sections of lenses in variable modification optical systems of Examples 1 through 6, respectively. In FIGS. 2 through 7, the left side is the object side, and the right side is the image side. The upper part illustrates the arrangement of lenses at wide angle end, and the lower part illustrates the arrangement of the lenses at tele end. Further, optical member PP is also illustrated. Aperture stop St illustrated in FIGS. 2 through 7 does not necessarily represent the size nor the form of the aperture stop St, but the position of the aperture stop St on the optical axis Z.

Table 1 shows lens data about the variable magnification optical system of Example 1. Table 2 shows various data about the variable magnification optical system of Example 1. Table 3 shows aspheric surface data about the variable magnification optical system of Example 1. Similarly, Tables 4 through 18 show lens data, various data and aspheric surface data for the variable magnification optical systems of Examples 2 through 6. The meanings of the signs in the tables will be described by using Example 1, as an example. The meanings of the signs are basically the same in Examples 2 through 6.

In the lens data of Table 1, column Si shows the surface number of i-th surface (i=1, 2, 3, . . . ). The surface number of the object-side surface of the most object side element is 1, and surface numbers sequentially increase toward the image side. Column Ri shows the curvature radius of the i-th surface, and column Di shows an interval between i-th surface and (i+1)th surface on optical axis Z. Column Nej shows the refractive index of j-th (j=1, 2, 3, . . . ) optical element for e-line (wavelength is 546.07 nm). The number of the optical element located on the most object side is 1, and numbers sequentially increase toward the image side. Further, column vdj shows the Abbe number of the j-th optical element for d-line (wavelength is 587.6 nm). Here, the sign of the curvature radius is positive when a surface facing the object side is convex, and the sign of the curvature radius is negative when a surface facing the image side is convex. The lens data include aperture stop St and optical member PP. In the column Ri of curvature radius, the term "(APERTURE STOP)" is written for the surface corresponding to aperture stop St.

In the lens data of Table 1, "VARIABLE 1" AND "VARIABLE 2" are written in the rows of intervals between surfaces that change when magnification is changed. The "VARIABLE 1" represents an interval between the first lens group G1 and the aperture stop St. The "VARIABLE 2" represents an interval between the aperture stop St and the second lens group G2.

The various data in Table 2 show the focal length of the entire system for e-line, F-number, the full angle of view, and values of "VARIABLE 1" AND "VARIABLE 2" at wide angle end and at tele end. In the lens data and various data, the unit of angle is degrees, and the unit of length is "mm". However, since optical systems can achieve similar optical performance when they are proportionally enlarged or proportionally reduced, other appropriate units may be used.

In the lens data of Table 1, mark "*" is attached to the surface number of an aspheric surface. Table 1 shows, as the curvature radius of an aspheric surface, the numerical value of the paraxial curvature radius. The aspheric data in Table 3 show aspheric coefficients for the aspheric surfaces. In the aspheric data of Table 3, the numerical value "E-n" (n: integer) represents "×10$^{-n}$", and "E+n" represents "×10$^{n}$". Further, the aspheric coefficients are coefficients KA, Bm (m=3, 4, 5, . . . ) in the following equation (A) of aspheric surface:

$$Zd = C \cdot h^2 / \{1 + (1 - KA \cdot C^2 \cdot h^2)^{1/2}\} + \Sigma Bm \cdot h^m \quad (A),$$

where

Zd: depth of aspheric surface (length of a perpendicular from a point on an aspheric surface at height h to a flat plane that is perpendicular to an optical axis, the flat plane contacting with the vertex of the aspheric surface), h: height (distance from the optical axis to the lens surface), C: inverse number of paraxial curvature radius, and KA, Bm: aspheric coefficients (m=3, 4, 5, . . . 20).

TABLE 1

EXAMPLE 1
LENS DATA

| Si | Ri | Di | Nej | νdj |
|---|---|---|---|---|
| 1 | 47.0929 | 0.800 | 1.90560 | 38.0 |
| 2 | 6.2760 | 2.073 | | |
| 3 | 12.5001 | 0.650 | 1.80229 | 48.2 |
| 4 | 8.6209 | 1.768 | | |
| 5 | 151.2792 | 2.006 | 1.93432 | 18.9 |
| 6 | -17.7033 | 0.241 | | |
| 7 | -14.4769 | 0.850 | 1.80449 | 40.9 |
| *8 | -41.9282 | VARIABLE 1 | | |
| 9 | (APERTURE STOP) | VARIABLE 2 | | |
| *10 | 7.0176 | 2.624 | 1.49846 | 81.5 |
| *11 | 6453919.0151 | 0.100 | | |
| 12 | 14.7308 | 0.650 | 1.93432 | 18.9 |
| 13 | 11.7872 | 3.456 | 1.49846 | 81.5 |
| 14 | -11.2642 | 0.100 | | |
| 15 | 10.0745 | 1.572 | 2.00069 | 28.7 |
| 16 | 4.1639 | 0.504 | | |
| 17 | 4.8593 | 2.135 | 1.49205 | 56.9 |
| 18 | 20.8075 | 0.348 | | |
| 19 | ∞ | 1.500 | 1.51825 | 64.1 |
| 20 | ∞ | | | |

TABLE 2

EXAMPLE 1
VARIOUS DATA

| | FOCAL LENGTH | F-NUMBER | FULL ANGLE OF VIEW | VARIABLE 1 | VARIABLE 2 |
|---|---|---|---|---|---|
| WIDE ANGLE END | 2.874 | 1.35 | 126.2 | 12.288 | 8.848 |
| TELE END | 9.916 | 2.94 | 34.4 | 1.800 | 0.900 |

TABLE 3

EXAMPLE 1
ASPHERIC SURFACE DATA

| | 8-TH SURFACE | 10-TH SURFACE | 11-TH SURFACE |
|---|---|---|---|
| B3 | 1.2067383E-05 | 1.7707621E-04 | 2.8842698E-04 |
| B4 | -2.4320377E-04 | -2.0971001E-04 | 4.5153822E-04 |
| B5 | -3.7789518E-07 | 1.8548181E-05 | 6.6677248E-05 |
| B6 | 6.8022831E-08 | 3.0698762E-06 | -5.6620853E-08 |
| B7 | -2.3710792E-07 | 9.7190423E-08 | -2.6293824E-07 |
| B8 | -5.0941783E-08 | -4.0536057E-08 | 3.5106042E-08 |
| B9 | -5.8087748E-09 | -6.1975824E-09 | 1.6891578E-08 |
| B10 | -2.9541735E-10 | -3.6129000E-10 | 3.0123217E-09 |
| B11 | 3.8096977E-11 | 1.2543484E-10 | 2.8019972E-10 |
| B12 | 1.2839730E-11 | 4.0251974E-11 | -1.2282592E-11 |
| B13 | 1.9661300E-12 | 6.2154816E-12 | -1.1956598E-11 |
| B14 | 1.4884826E-13 | 3.0806093E-13 | -3.1971390E-12 |
| B15 | -1.4624686E-14 | -1.5426828E-13 | -6.1485188E-13 |
| B16 | -8.8126512E-15 | -6.2152780E-14 | -9.3359640E-14 |
| B17 | -2.1300954E-15 | -1.4858893E-14 | -1.0478601E-14 |
| B18 | -3.5595283E-16 | -2.3290885E-15 | -3.9842790E-16 |
| B19 | -3.7205040E-17 | -1.3067428E-16 | 2.0939499E-16 |
| B20 | 2.2795526E-18 | 8.1647194E-17 | 8.4731262E-17 |
| KA | 1.5503276E+00 | 7.1670789E-01 | 6.0558533E-01 |

TABLE 4

EXAMPLE 2
LENS DATA

| Si | Ri | Di | Nej | νdj |
|---|---|---|---|---|
| 1 | 47.5818 | 0.800 | 1.90645 | 37.1 |
| 2 | 6.2895 | 2.073 | | |
| 3 | 12.5021 | 0.650 | 1.88814 | 40.8 |
| 4 | 8.5837 | 1.739 | | |
| 5 | 103.3253 | 2.055 | 1.93432 | 18.9 |
| 6 | -17.7598 | 0.196 | | |
| 7 | -15.1752 | 0.850 | 1.81080 | 40.7 |
| *8 | -45.6866 | VARIABLE 1 | | |
| 9 | (APERTURE STOP) | VARIABLE 2 | | |
| *10 | 6.8462 | 2.661 | 1.49846 | 81.5 |
| *11 | -7294643.3399 | 0.100 | | |
| 12 | 16.3974 | 0.650 | 1.81643 | 22.8 |
| 13 | 12.4123 | 3.382 | 1.49846 | 81.5 |
| 14 | -11.1591 | 0.100 | | |
| 15 | 9.6105 | 1.532 | 2.01167 | 28.3 |
| 16 | 4.1291 | 0.501 | | |
| 17 | 4.8141 | 2.103 | 1.48915 | 70.2 |
| 18 | 18.8936 | 0.368 | | |
| 19 | ∞ | 1.500 | 1.51825 | 64.1 |
| 20 | ∞ | 4.200 | | |

TABLE 5

EXAMPLE 2 VARIOUS DATA

| | FOCAL LENGTH | F-NUMBER | FULL ANGLE OF VIEW | VARIABLE 1 | VARIABLE 2 |
|---|---|---|---|---|---|
| WIDE ANGLE END | 2.874 | 1.35 | 125.4 | 12.500 | 8.772 |
| TELE END | 9.916 | 2.93 | 34.4 | 1.774 | 0.900 |

TABLE 6

EXAMPLE 2 ASPHERIC SURFACE DATA

| | 8-TH SURFACE | 10-TH SURFACE | 11-TH SURFACE |
|---|---|---|---|
| B3 | 4.8439448E−05 | 1.7749491E−04 | 2.8315754E−04 |
| B4 | −2.7382292E−04 | −2.1486195E−04 | 4.6438892E−04 |
| B5 | 5.1301423E−06 | 1.7264642E−05 | 7.0267122E−05 |
| B6 | 1.2143360E−07 | 3.2114921E−06 | −4.2587194E−08 |
| B7 | −3.3574218E−07 | 1.5709260E−07 | −2.9495949E−07 |
| B8 | −6.4909837E−08 | −3.1655090E−08 | 3.4121871E−08 |
| B9 | −6.2864249E−09 | −5.7485192E−09 | 1.8156698E−08 |
| B10 | −1.1707856E−10 | −4.6819406E−10 | 3.4267772E−09 |
| B11 | 8.4494141E−11 | 9.5219673E−11 | 3.6475834E−10 |
| B12 | 1.9135401E−11 | 3.7425822E−11 | 6.5571050E−13 |
| B13 | 2.3616508E−12 | 6.6835460E−12 | −1.0493530E−11 |
| B14 | 8.4340916E−14 | 5.8196483E−13 | −3.1146542E−12 |
| B15 | −4.3026141E−14 | −8.2016961E−14 | −6.2866362E−13 |
| B16 | −1.5076199E−14 | −4.8318605E−14 | −9.9403838E−14 |
| B17 | −3.0858736E−15 | −1.2980041E−14 | −1.1829106E−14 |
| B18 | −4.3921179E−16 | −2.2369849E−15 | −6.2195340E−16 |
| B19 | −2.6755270E−17 | −1.8162637E−16 | 1.8334935E−16 |
| B20 | 9.8835833E−18 | 5.7271040E−17 | 8.4165383E−17 |
| KA | 1.5991271E+00 | 7.0078904E−01 | 6.0558080E−01 |

TABLE 9

EXAMPLE 3 ASPHERIC SURFACE DATA

| | 8-TH SURFACE | 10-TH SURFACE | 11-TH SURFACE |
|---|---|---|---|
| B3 | 2.3239557E−05 | 1.0304841E−04 | 1.6837244E−04 |
| B4 | −2.5907356E−04 | −2.0944146E−04 | 3.4084789E−04 |
| B5 | 9.2225086E−07 | 1.6169838E−05 | 5.0456886E−05 |
| B6 | −3.0359746E−09 | 2.7868348E−06 | −2.2948006E−06 |
| B7 | −2.7650108E−07 | 9.4730761E−08 | −5.5866666E−07 |
| B8 | −5.5395030E−08 | −3.6815631E−08 | 2.7932756E−11 |
| B9 | −5.8926754E−09 | −5.7044358E−09 | 1.3567230E−08 |
| B10 | −2.4746333E−10 | −3.8153430E−10 | 2.8559958E−09 |
| B11 | 4.4864180E−11 | 1.0423193E−10 | 3.0958678E−10 |
| B12 | 1.2239865E−11 | 3.5021067E−11 | −6.6784082E−13 |
| B13 | 1.4718502E−12 | 5.3701715E−12 | −9.3332487E−12 |
| B14 | 8.0570046E−15 | 2.2036095E−13 | −2.7065192E−12 |
| B15 | −4.4338392E−14 | −1.5421196E−13 | −5.3189539E−13 |
| B16 | −1.3821778E−14 | −5.9143110E−14 | −8.0170660E−14 |
| B17 | −2.7959057E−15 | −1.3832509E−14 | −8.4601629E−15 |
| B18 | −4.0774380E−16 | −2.0758989E−15 | −9.4985789E−17 |
| B19 | −3.0690400E−17 | −7.6598876E−17 | 2.5515746E−16 |
| B20 | 6.7089356E−18 | 9.2301671E−17 | 9.1770600E−17 |
| KA | 1.5631440E+00 | 1.2767423E−01 | 2.9109721E−01 |

TABLE 7

EXAMPLE 3 LENS DATA

| Si | Ri | Di | Nej | vdj |
|---|---|---|---|---|
| 1 | 51.5145 | 0.800 | 1.90562 | 38.0 |
| 2 | 6.1157 | 2.056 | | |
| 3 | 12.5013 | 0.650 | 1.85266 | 43.2 |
| 4 | 8.8125 | 1.727 | | |
| 5 | 1339.4377 | 1.961 | 1.93432 | 18.9 |
| 6 | −16.5923 | 0.218 | | |
| 7 | −13.9852 | 0.850 | 1.80414 | 46.0 |
| *8 | −33.2305 | VARIABLE 1 | | |
| 9 | (APERTURE STOP) | VARIABLE 2 | | |
| *10 | 7.0353 | 3.153 | 1.49846 | 81.5 |
| *11 | −21.0511 | 0.100 | | |
| 12 | 18.1893 | 0.650 | 1.81643 | 22.8 |
| 13 | 12.3100 | 3.278 | 1.49846 | 81.5 |
| 14 | −11.8558 | 0.100 | | |
| 15 | 13.3133 | 1.300 | 1.96454 | 32.2 |
| 16 | 4.2991 | 0.574 | | |
| 17 | 5.1157 | 2.114 | 1.49204 | 56.9 |
| 18 | 27.2289 | 0.292 | | |
| 19 | ∞ | 1.500 | 1.51825 | 64.1 |
| 20 | ∞ | 4.200 | | |

TABLE 10

EXAMPLE 4 LENS DATA

| Si | Ri | Di | Nej | vdj |
|---|---|---|---|---|
| 1 | 48.3515 | 0.800 | 1.89975 | 38.6 |
| 2 | 6.0827 | 2.360 | | |
| 3 | 16.4333 | 0.650 | 1.75475 | 52.9 |
| 4 | 9.4910 | 1.262 | | |
| 5 | 35.6326 | 2.017 | 1.93432 | 18.9 |
| 6 | −24.2894 | 0.146 | | |
| *7 | −21.4603 | 0.850 | 1.81080 | 40.7 |
| *8 | −2499.7791 | VARIABLE 1 | | |
| 9 | (APERTURE STOP) | VARIABLE 2 | | |
| *10 | 7.7837 | 2.998 | 1.49846 | 81.5 |
| *11 | −25.4451 | 0.100 | | |
| 12 | 17.2012 | 0.650 | 1.81643 | 22.8 |
| 13 | 12.2085 | 3.663 | 1.49846 | 81.5 |
| 14 | −10.0738 | 0.278 | | |
| 15 | 11.0421 | 0.772 | 1.96706 | 32.0 |
| 16 | 4.5569 | 0.804 | | |
| 17 | 5.4586 | 2.238 | 1.49186 | 62.5 |
| 18 | 16.0601 | 0.478 | | |
| 19 | ∞ | 1.500 | 1.51825 | 64.1 |
| 20 | ∞ | 4.335 | | |

TABLE 8

EXAMPLE 3 VARIOUS DATA

| | FOCAL LENGTH | F-NUMBER | FULL ANGLE OF VIEW | VARIABLE 1 | VARIABLE 2 |
|---|---|---|---|---|---|
| WIDE ANGLE END | 2.874 | 1.36 | 126.6 | 12.137 | 9.051 |
| TELE END | 9.916 | 2.99 | 34.4 | 1.835 | 0.900 |

TABLE 11

EXAMPLE 4 VARIOUS DATA

|  | FOCAL LENGTH | F-NUMBER | FULL ANGLE OF VIEW | VARIABLE 1 | VARIABLE 2 |
|---|---|---|---|---|---|
| WIDE ANGLE END | 2.874 | 1.32 | 128.8 | 11.309 | 9.650 |
| TELE END | 9.916 | 3.03 | 34.6 | 2.430 | 0.900 |

TABLE 12

EXAMPLE 4 ASPHERIC SURFACE DATA

|  | 7-TH SURFACE | 8-TH SURFACE | 10-TH SURFACE | 11-TH SURFACE |
|---|---|---|---|---|
| B3 | −8.1652311E−04 | −7.1033038E−04 | 1.0029642E−04 | 1.7826390E−04 |
| B4 | 2.2084187E−05 | −2.7351706E−04 | −2.0573362E−04 | 3.6596126E−04 |
| B5 | 4.0411292E−06 | 1.4483095E−05 | 1.6033635E−05 | 4.9673696E−05 |
| B6 | 6.2039583E−07 | 1.3442234E−06 | 1.5708379E−06 | −1.5699670E−06 |
| B7 | 8.3548175E−08 | −3.0591542E−07 | −4.8195015E−08 | −4.9239102E−07 |
| B8 | 3.5622984E−09 | −8.2278588E−08 | −4.4319193E−08 | −1.4913480E−08 |
| B9 | −1.2815675E−09 | −1.0776594E−08 | −7.2289737E−09 | 7.9514258E−09 |
| B10 | −4.0775822E−10 | −8.2842072E−10 | −1.0892820E−09 | 1.7652607E−09 |
| B11 | −7.2226369E−11 | 5.6041275E−12 | −9.0083795E−11 | 1.4289580E−10 |
| B12 | −9.6013072E−12 | 1.5458115E−11 | −2.9794503E−12 | −2.4252727E−11 |
| B13 | −9.1371268E−13 | 3.4275793E−12 | −2.4345160E−13 | −1.2802163E−11 |
| B14 | −2.5760937E−14 | 5.0901576E−13 | −3.8339358E−13 | −3.2605590E−12 |
| B15 | 1.3972768E−14 | 5.3609102E−14 | −1.8649875E−13 | −6.2427232E−13 |
| B16 | 5.0917385E−15 | 1.9498712E−15 | −5.5321453E−14 | −9.4783555E−14 |
| B17 | 1.2091668E−15 | −8.6058196E−16 | −1.2776243E−14 | −1.0315433E−14 |
| B18 | 2.4811258E−16 | −3.1887010E−16 | −2.1122181E−15 | −2.0053004E−16 |
| B19 | 5.0421542E−17 | −7.5847477E−17 | −1.7444518E−16 | 2.9392421E−16 |
| B20 | 9.8865955E−18 | −1.4616360E−17 | 4.9800578E−17 | 1.1193859E−16 |
| KA | −9.4429183E−02 | 1.5523542E+00 | 1.1397710E−01 | 1.2488763E−01 |

TABLE 13

EXAMPLE 5 LENS DATA

| Si | Ri | Di | Nej | vdj |
|---|---|---|---|---|
| 1 | 38.3396 | 0.800 | 1.88814 | 40.8 |
| 2 | 6.4735 | 2.156 |  |  |
| 3 | 12.5013 | 0.650 | 1.73234 | 54.7 |
| 4 | 8.5254 | 1.680 |  |  |
| 5 | 49.0921 | 2.229 | 1.93432 | 18.9 |
| 6 | −21.4836 | 0.296 |  |  |
| *7 | −16.5320 | 0.850 | 1.80800 | 40.4 |
| *8 | −832.5905 | VARIABLE 1 |  |  |
| 9 | (APERTURE STOP) | VARIABLE 2 |  |  |
| *10 | 7.4544 | 3.239 | 1.49664 | 82.0 |
| *11 | −26.1043 | 0.100 |  |  |
| 12 | 19.6757 | 0.650 | 1.81643 | 22.8 |
| 13 | 13.1377 | 3.620 | 1.49846 | 81.5 |
| 14 | −9.7973 | 0.100 |  |  |
| 15 | 10.0941 | 0.693 | 2.01167 | 28.3 |
| 16 | 4.5737 | 0.730 |  |  |
| 17 | 5.4557 | 2.150 | 1.57046 | 42.8 |
| 18 | 13.7309 | 0.546 |  |  |
| 19 | ∞ | 1.500 | 1.51825 | 64.1 |
| 20 | ∞ | 4.335 |  |  |

TABLE 14

EXAMPLE 5 VARIOUS DATA

|  | FOCAL LENGTH | F-NUMBER | FULL ANGLE OF VIEW | VARIABLE 1 | VARIABLE 2 |
|---|---|---|---|---|---|
| WIDE ANGLE END | 2.874 | 1.35 | 127.8 | 11.405 | 9.131 |
| TELE END | 9.916 | 2.96 | 34.4 | 1.741 | 0.900 |

TABLE 15

EXAMPLE 5 ASPHERIC SURFACE DATA

|  | 7-TH SURFACE | 8-TH SURFACE | 10-TH SURFACE | 11-TH SURFACE |
|---|---|---|---|---|
| B3 | −4.9893316E−04 | −3.9612372E−04 | 1.7090295E−04 | 1.9770986E−04 |
| B4 | −2.0736256E−05 | −2.7950072E−04 | −2.0761598E−04 | 3.8371219E−04 |
| B5 | 6.6513454E−06 | 1.0703903E−05 | 2.8840419E−05 | 4.3454281E−05 |
| B6 | 9.5092416E−07 | 1.2175101E−06 | 1.5315006E−06 | −7.2219480E−07 |

TABLE 15-continued

EXAMPLE 5 ASPHERIC SURFACE DATA

|     | 7-TH SURFACE    | 8-TH SURFACE    | 10-TH SURFACE   | 11-TH SURFACE   |
| --- | --------------- | --------------- | --------------- | --------------- |
| B7  | 4.7989832E−08   | −2.0077996E−07  | −2.0578203E−07  | −2.7002512E−07  |
| B8  | −6.9866686E−09  | −5.2782858E−08  | −5.9782353E−08  | −6.0183797E−09  |
| B9  | −2.0513866E−09  | −6.0759397E−09  | −7.1861016E−09  | 3.5060534E−09   |
| B10 | −2.9401976E−10  | −3.4303034E−10  | −9.4148844E−10  | 4.4670028E−10   |
| B11 | −2.4720566E−11  | 1.9051779E−11   | −9.3156347E−11  | −8.5391293E−11  |
| B12 | −8.9986418E−13  | 7.2081087E−12   | −1.2321486E−11  | −5.2457969E−11  |
| B13 | −3.9261224E−14  | 7.6317550E−13   | −3.1440738E−12  | −1.4931194E−11  |
| B14 | −3.7866310E−14  | −2.2247482E−14  | −9.8327547E−13  | −3.1730676E−12  |
| B15 | −2.0975511E−14  | −3.1427601E−14  | −2.7747945E−13  | −5.5024158E−13  |
| B16 | −5.8995189E−15  | −8.8892854E−15  | −6.5517188E−14  | −7.6405953E−14  |
| B17 | −1.2727351E−15  | −1.7020398E−15  | −1.2886444E−14  | −6.9069805E−15  |
| B18 | −2.2291804E−16  | −2.5307227E−16  | −1.7813804E−15  | 3.2498277E−16   |
| B19 | −2.8351876E−17  | −2.3601243E−17  | −5.1441083E−17  | 3.5712195E−16   |
| B20 | −1.3337970E−18  | 9.4104913E−19   | 8.3063552E−17   | 1.1692547E−16   |
| KA  | 1.1938821E+00   | 1.5486182E+00   | −9.6667664E−02  | 5.0517392E−02   |

TABLE 16

EXAMPLE 6 LENS DATA

| Si  | Ri              | Di          | Nej     | vdj  |
| --- | --------------- | ----------- | ------- | ---- |
| 1   | 34.1032         | 0.800       | 1.88814 | 40.8 |
| 2   | 6.8935          | 2.101       |         |      |
| 3   | 12.5494         | 0.650       | 1.69979 | 55.5 |
| 4   | 8.0386          | 1.807       |         |      |
| 5   | 39.4907         | 2.301       | 1.93432 | 18.9 |
| 6   | −22.0923        | 0.455       |         |      |
| *7  | −14.7447        | 0.900       | 1.80800 | 40.4 |
| *8  | 249.9763        | VARIABLE 1  |         |      |
| 9   | (APERTURE STOP) | VARIABLE 2  |         |      |
| *10 | 7.6696          | 3.314       | 1.49664 | 82.0 |
| *11 | −25.7571        | 0.100       |         |      |
| 12  | 15.1813         | 0.652       | 1.79192 | 25.7 |
| 13  | 10.7120         | 3.477       | 1.49846 | 81.5 |
| 14  | −10.7120        | 0.100       |         |      |
| 15  | 12.9790         | 1.147       | 2.01167 | 28.3 |
| 16  | 4.7397          | 0.764       |         |      |
| 17  | 5.8011          | 2.622       | 1.57046 | 42.8 |
| 18  | 25.5394         | 0.344       |         |      |
| 19  | ∞               | 1.000       | 1.51825 | 64.1 |
| 20  | ∞               | 4.249       |         |      |

TABLE 17

EXAMPLE 6 VARIOUS DATA

|                 | FOCAL LENGTH | F-NUMBER | FULL ANGLE OF VIEW | VARIABLE 1 | VARIABLE 2 |
| --------------- | ------------ | -------- | ------------------ | ---------- | ---------- |
| WIDE ANGLE END  | 2.874        | 1.35     | 137.2              | 10.601     | 9.213      |
| TELE END        | 9.914        | 3.05     | 36.2               | 2.000      | 0.814      |

TABLE 18

EXAMPLE 6 ASPHERIC SURFACE DATA

|     | 7-TH SURFACE    | 8-TH SURFACE    | 10-TH SURFACE   | 11-TH SURFACE   |
| --- | --------------- | --------------- | --------------- | --------------- |
| B3  | −2.5994267E−04  | −1.8033497E−04  | 1.6098038E−04   | 1.2497029E−04   |
| B4  | −9.6382102E−05  | −4.2686040E−04  | −2.1211870E−04  | 3.6556884E−04   |
| B5  | 4.2258546E−05   | 3.9961388E−05   | 3.7949279E−05   | 2.6138171E−05   |
| B6  | 1.5066338E−06   | 1.8180323E−06   | 2.4904898E−07   | −1.1907632E−07  |
| B7  | −4.2416096E−07  | −6.1376045E−07  | −3.3356436E−07  | 1.6519442E−07   |
| B8  | −7.3826839E−08  | −9.6263451E−08  | −2.7543028E−08  | 1.5657995E−08   |
| B9  | −3.0703135E−09  | −4.2253853E−09  | 5.1537016E−10   | −4.1637572E−09  |
| B10 | 1.0769024E−09   | 7.8897190E−10   | −4.9006034E−10  | −1.3760271E−09  |
| B11 | 3.2048715E−10   | 1.7907106E−10   | −2.0114544E−10  | −2.4481626E−10  |
| B12 | 4.6444053E−11   | 1.7797617E−11   | −4.3775500E−11  | −3.1562951E−11  |
| B13 | 2.8096334E−12   | −2.1603721E−13  | −6.2937508E−12  | −4.2181035E−12  |
| B14 | −6.0045231E−13  | −4.0861413E−13  | −5.1244974E−13  | −6.4908449E−13  |
| B15 | −2.6429298E−13  | −8.5921033E−14  | −1.6129329E−16  | −1.2729705E−13  |
| B16 | −5.9648795E−14  | −1.1508281E−14  | 6.9575472E−15   | −2.5491076E−14  |
| B17 | −9.3991857E−15  | −7.3739746E−16  | 1.4999522E−16   | −3.9304654E−15  |
| B18 | −8.2471684E−16  | 4.9549404E−17   | −4.0050590E−16  | −2.4403800E−16  |
| B19 | 1.0397884E−16   | 6.8376124E−18   | −1.2117753E−16  | 5.6186253E−17   |
| B20 | 7.6996025E−17   | −7.2786590E−18  | −1.5600082E−17  | 3.7522350E−17   |
| KA  | 3.5116905E+00   | 1.5299986E+00   | −2.1862327E−01  | 1.0557304E−01   |

The schematic structure of the variable magnification optical system of Example 1 will be described. The variable magnification optical system of Example 1 includes first lens group G1, which is four-lens group, and second lens group G2, which is five-lens group, and the first lens group G1 and the second lens group G2 are sequentially arranged from the object side. In the first lens group G1, negative lens L1, negative lens L2, positive lens L3, and negative lens L4 are sequentially arrange from the object side. The negative lens L1 is in meniscus form having a convex surface facing the object side, and the negative lens L2 is in meniscus form having a convex surface facing the object side. The positive lens L3 is in double convex form, and the negative lens L4 is in meniscus form having a convex surface facing the image side in the paraxial region. In the second lens group G2, positive lens L5, a cemented lens of negative lens L6 and positive lens L7, negative lens L8, and positive lens L9 are sequentially arranged from the objet side. The positive lens L5 is in meniscus form having a convex surface facing the object side in the paraxial region. The negative lens L6 is in meniscus form having a convex surface facing the object side, and the positive lens L7 is in double convex form. The negative lens L8 is in meniscus form having a convex surface facing the object side, and the positive lens L9 is in meniscus form having a convex surface facing the object side. The image-side surface of the lens L4 and the two sides (object-side and image-side) of the lens L5 are aspheric.

The schematic structure of the variable magnification optical systems of Examples 2 and 3 differs from that of Example 1 in that the lens L5 is in double convex form in the paraxial region in Examples 2 and 3, but the remaining structure is similar to that of Example 1. The schematic structure of the variable magnification optical systems of Examples 4 and 5 differs from that of Example 1 in that the lens L5 is in double convex form in the paraxial region and the two sides of the lens L4 and the two sides of the lens L5 are aspheric in Examples 4 and 5. However, the remaining structure is similar to that of Example 1. The schematic structure of the variable magnification optical system of Example 6 differs from that of Example 1 in that the lens L4 is in double concave form in the paraxial region, the lens L5 is in double convex form in the paraxial region, and the two sides of the lens L4 and the two sides of the lens L5 are aspheric in Example 6. However, the remaining structure is similar to that of Example 1.

Figure 8A:
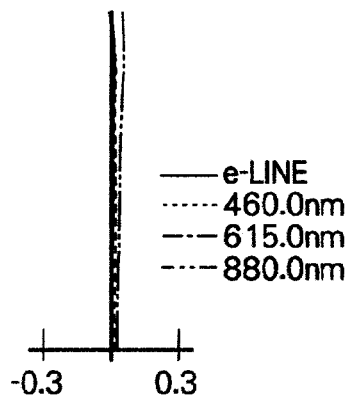
FIGS. 8A through 8F are diagrams illustrating longitudinal aberrations of the variable magnification optical system in Example 1 of the present invention.
Figure 8B:
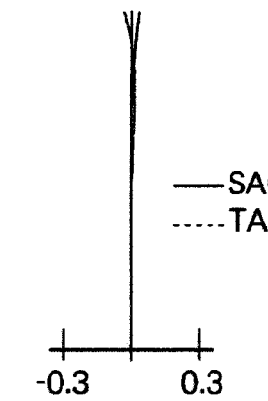
Figure 8C:
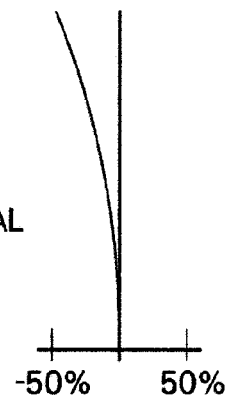
Figure 8D:
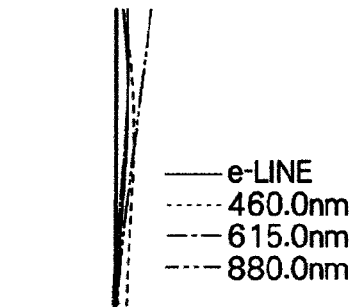
Figure 8E:
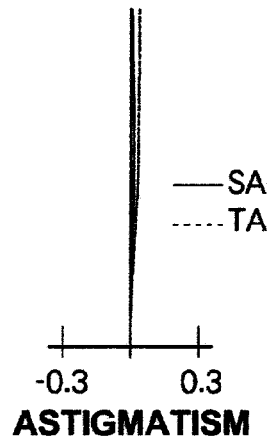
Figure 8F:
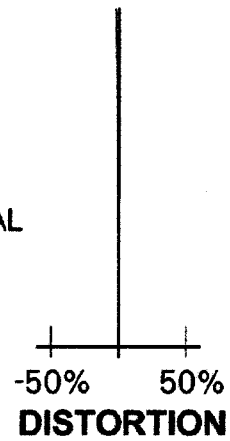
Figure 14A:
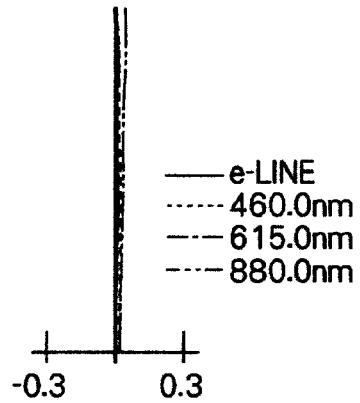
FIGS. 14A through 14F are diagrams illustrating longitudinal aberrations of the variable magnification optical system in Example 3 of the present invention.
Figure 14B:
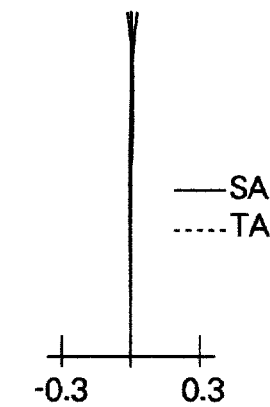
Figure 14C:
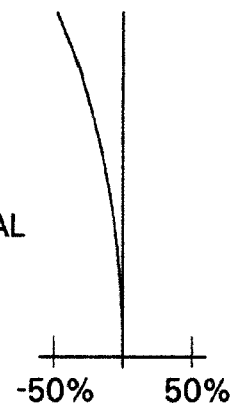
Figure 14D:
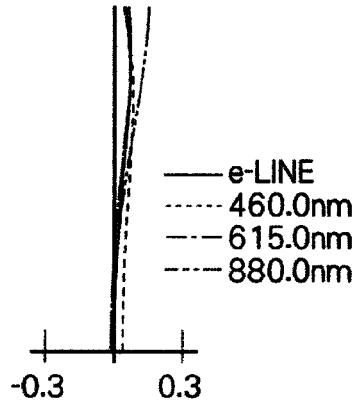
Figure 14E:
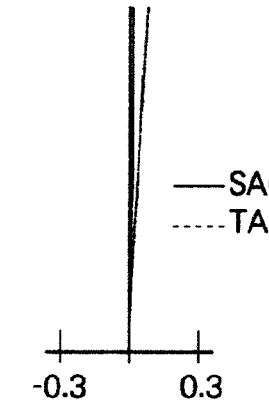
Figure 14F:
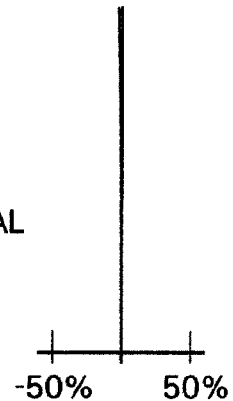
Figure 15F:
Figure 15G:
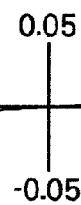
Figure 15H:
Figure 15I:
Figure 17A:
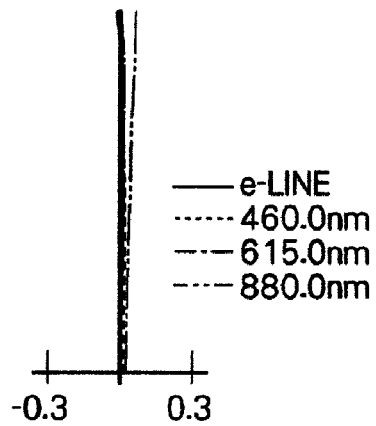
FIGS. 17A through 17F are diagrams illustrating longitudinal aberrations of the variable magnification optical system in Example 4 of the present invention.
Figure 17B:
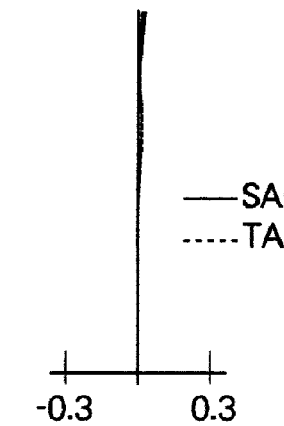
Figure 17C:
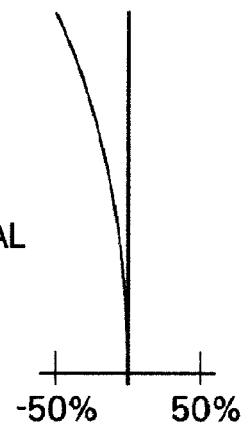
Figure 17D:
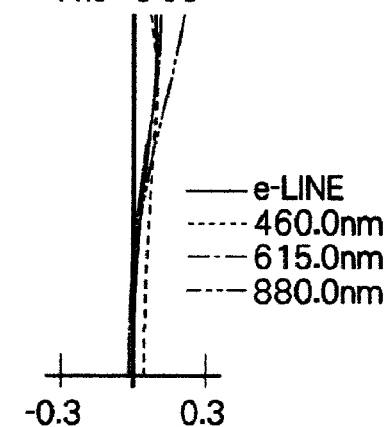
Figure 17E:
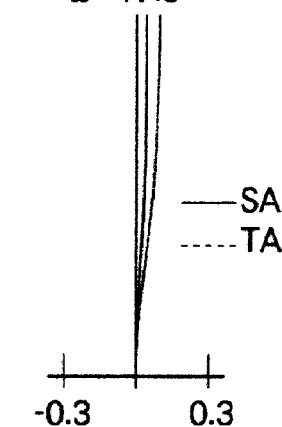
Figure 17F:
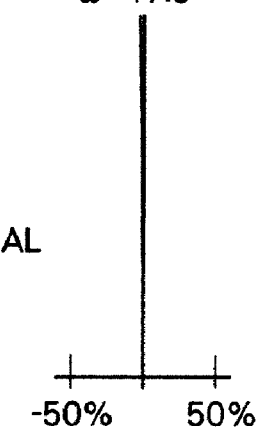
Figure 20A:
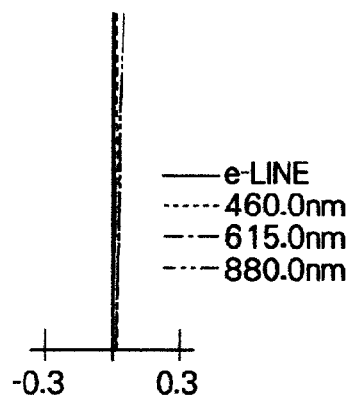
FIGS. 20A through 20F are diagrams illustrating longitudinal aberrations of the variable magnification optical system in Example 5 of the present invention.
Figure 20B:
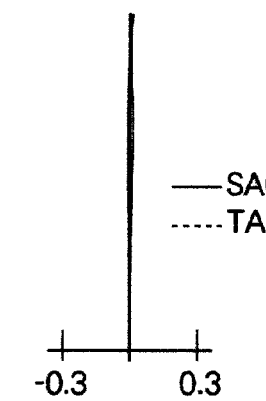
Figure 20C:
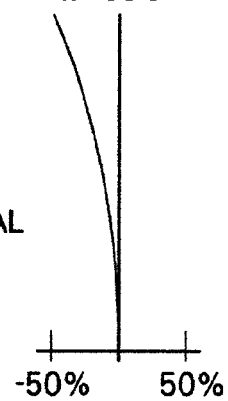
Figure 20D:
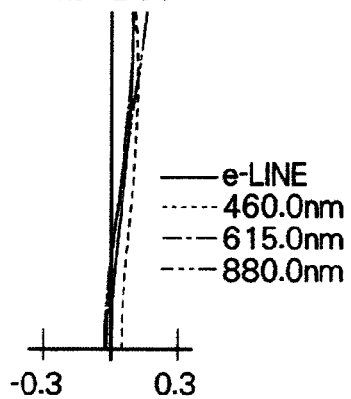
Figure 20E:
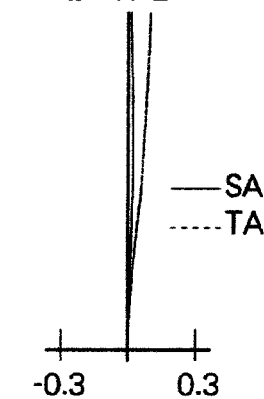
Figure 20F:
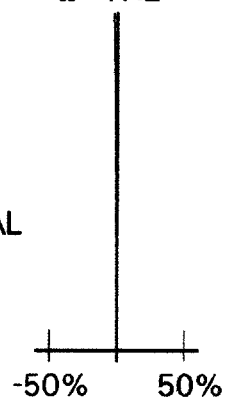
Figure 23A:
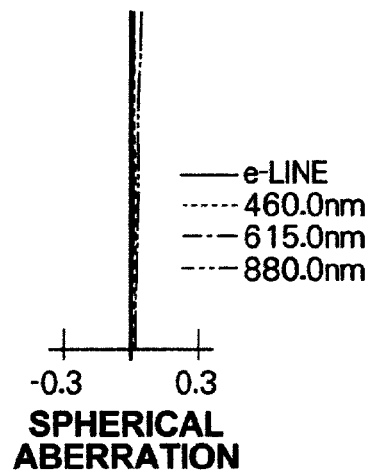
FIGS. 23A through 23F are diagrams illustrating longitudinal aberrations of the variable magnification optical system in Example 6 of the present invention.
Figure 23B:
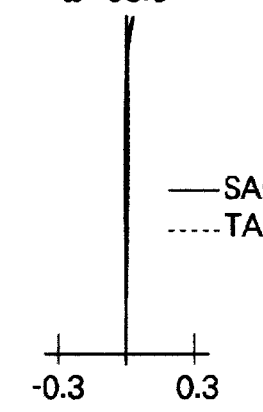
Figure 23C:
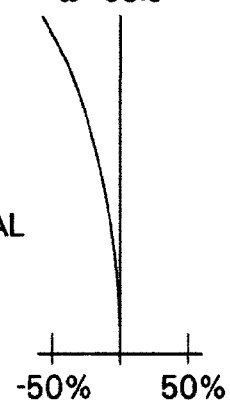
Figure 23D:
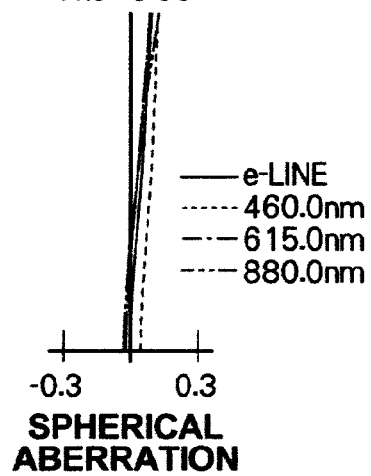
Figure 23E:
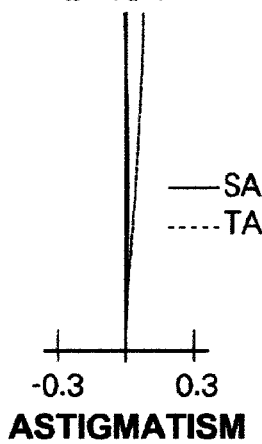
Figure 23F:
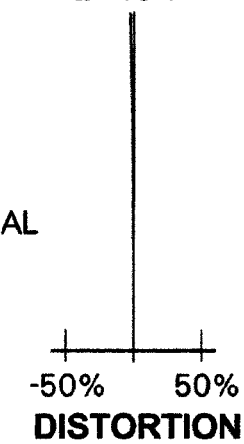

FIGS. 8A through 8F are diagrams illustrating longitudinal aberrations of the variable magnification optical system of Example 1. FIGS. 9A through 9I and 10A through 10I are diagrams illustrating lateral aberrations of the variable magnification optical system of Example 1. FIGS. 8A through 8C illustrate spherical aberration, astigmatism, distortion (distortion aberration) at wide angle end. FIGS. 8D through 8F illustrate spherical aberration, astigmatism, distortion at tele end. FIGS. 9A through 9E illustrate lateral aberrations in a tangential direction for each angle of view at wide angle end. FIGS. 9F through 9I illustrate lateral aberrations in a sagittal direction for each angle of view at wide angle end. In FIGS. 9A through 9I, diagrams for the same half angle of view are arranged next to each other in the horizontal direction. FIGS. 10A through 10E illustrate lateral aberrations in a tangential direction for each angle of view at tele end. FIGS. 10F through 10I illustrate lateral aberrations in a sagittal direction for each angle of view at tele end. In FIGS. 10A through 10I, diagrams for the same half angle of view are arranged next to each other in the horizontal direction. In the diagram illustrating spherical aberration, aberration with respect to e-line is indicated by a solid line, and aberration with respect to the wavelength of 460 nm is indicated by a broken line. Further, aberration with respect to the wavelength of 615 nm is indicated by a dot dashed line, and aberration with respect to the wavelength of 880 nm is indicated by a two-dot dashed line. In the diagram illustrating astigmatism, aberration in the sagittal direction is indicated by a solid line, and aberration in the tangential direction is indicated by a dotted line. In other diagrams illustrating aberration, aberrations with respect to e-line are illustrated. In the diagram illustrating spherical aberration, Fno. represents F-number. In the other diagrams, ω represents half angle of view. Here, in the diagrams illustrating spherical aberration and astigmatism, the unit of scale of the horizontal axis is mm. In the diagrams illustrating lateral aberrations, the unit of scale of the vertical axis is mm. However, in the drawings, illustration of the unit is omitted.

Further, diagrams illustrating aberrations of the variable magnification optical systems of Examples 2 through 6 in a similar manner to the diagrams of Example 1 are in the drawings attached hereto. FIGS. 11A through 11F illustrate longitudinal aberrations of the variable magnification optical system of Example 2. FIGS. 12A through 12I illustrate lateral aberrations at wide angle end. FIGS. 13A through 13I illustrate lateral aberrations at tele end. FIGS. 14A through 14F illustrate longitudinal aberrations of the variable magnification optical system of Example 3. FIGS. 15A through 15I illustrate lateral aberrations at wide angle end. FIGS. 16A through 16I illustrate lateral aberrations at tele end. FIGS. 17A through 17F illustrate longitudinal aberrations of the variable magnification optical system of Example 4. FIGS. 18A through 18I illustrate lateral aberrations at wide angle end. FIGS. 19A through 19I illustrate lateral aberrations at tele end. FIGS. 20A through 20F illustrate longitudinal aberrations of the variable magnification optical system of Example 5. FIGS. 21A through 21I illustrate lateral aberrations at wide angle end. FIGS. 22A through 22I illustrate lateral aberrations at tele end. FIGS. 23A through 23F illustrate longitudinal aberrations of the variable magnification optical system of Example 6. FIGS. 24A through 24I illustrate lateral aberrations at wide angle end. FIGS. 25A through 25I illustrate lateral aberrations at tele end.

Table 19 shows values corresponding to Formulas (1) through (5) in the variable magnification optical systems of Examples 1 through 6. Table 19 shows values obtained when the reference wavelength is e-line, and a light beam enters based on each specification data as described above.

TABLE 19

| | VALUE CORRESPONDING TO FORMULA | | | | |
|---|---|---|---|---|---|
| | (1) Ne5 | (2) vd5 | (3) f5/fG2 | (4) Ne8 | (5) vd7 |
| EXAMPLE 1 | 1.49846 | 81.5 | 1.534 | 2.00069 | 81.5 |
| EXAMPLE 2 | 1.49846 | 81.5 | 1.497 | 2.01167 | 81.5 |
| EXAMPLE 3 | 1.49846 | 81.5 | 1.182 | 1.96454 | 81.5 |
| EXAMPLE 4 | 1.49846 | 81.5 | 1.309 | 1.96706 | 81.5 |
| EXAMPLE 5 | 1.49664 | 82.0 | 1.311 | 2.01167 | 81.5 |
| EXAMPLE 6 | 1.49664 | 82.0 | 1.358 | 2.01167 | 81.5 |

As the data show, all of the variable magnification optical systems of Examples 1 through 6 satisfy the formulas (1) through (5). The structure is compact. Further, while a large aperture ratio, such as the F-number of approximately 1.3 at wide angle end, is maintained, the full angle of view at wide angle end is in the range of 125° to 137°, which is relatively wide. Further, each aberration is corrected in an excellent manner in a visible light range and in a near-infrared light range. The optical performance is high both at wide angle end and at tele end.

FIG. 26 is a schematic diagram illustrating the configuration of a monitor camera according to an embodiment of an imaging apparatus of the present invention. A monitor camera 10 illustrated in FIG. 26 includes the variable magnification optical system 1 according to an embodiment of the present invention and an imaging device 5. The variable magnification optical system 1 is arranged in the inside of a cylinder that is in substantially cylindrical form. The imaging device 5 images an image of a subject formed by the variable magnification optical system 1. Specific examples of the imaging device 5 are CCD, CMOS, and the like, which convert optical images formed by the variable magnification optical system 1 into electric signals. The imaging device 5 is arranged in such a manner that the imaging plane of the imaging device 5 and the image plane of the variable magnification optical system 1 become the same. Further, an aperture lever 12 for changing the diameter of the aperture stop St is provided on the upper side of the cylinder. Further, a zoom lever 13 and a focus lever 14 are provided on the lower side of the cylinder. The zoom lever 13 changes the magnification ratio of the variable magnification optical system 1, and the focus lever 14 adjusts the focus of the variable magnification optical system 1.

The variable magnification optical system 1 according to the embodiment of the present invention has aforementioned advantageous points. Therefore, the imaging apparatus according to the embodiment of the present invention has excellent compactness. Further, excellent photography (imaging) is possible even under low illumination. Further, it is possible to obtain high quality video images (images) for a wide wavelength band including a visible light range through a near-infrared light range.

So far, the present invention has been described by using the embodiments and examples. However, the present invention is not limited to the aforementioned embodiments and examples, and various modifications are possible. For example, the values of curvature radius, surface interval, refractive index, Abbe number, and aspheric surface coefficients of each lens element are not limited to the numerical values of the aforementioned examples, and may be other values.

Further, in the embodiment of the imaging apparatus, a case in which the imaging apparatus of the present invention is applied to a monitor camera was described with reference to the drawing. However, the use of the imaging apparatus of the present invention is not limited to the monitor camera. The imaging apparatus of the present invention may be applied, for example, to a video camera, an electronic still camera, and the like.

What is claimed is:

1. A variable magnification optical system comprising:
a first lens group having negative refractive power;
an aperture stop; and
a second lens group having positive refractive power, which are sequentially arranged from the object side of the variable magnification optical system,
wherein the magnification of the variable magnification optical system is changed by changing an interval between the first lens group and the second lens group in the direction of an optical axis, and the position of an image plane is corrected by moving the first lens group in the direction of the optical axis when correction of the position of the image plane becomes necessary by changing the magnification, and
wherein the second lens group includes, sequentially arranged from the object side of the variable magnification optical system:
an aspheric lens that is arranged on the most object side of the second lens group, and the object-side surface of the aspheric lens being an aspheric surface and a central portion of the aspheric surface being in convex form,
a cemented lens composed of two lenses, wherein one of the two lenses of the cemented lens is a positive lens and the other one of the cemented lens is a negative lens,
a negative lens having a concave surface facing the image side of the variable magnification optical system, and
a positive lens having a convex surface facing the object side of the variable magnification optical system, and
wherein the object-side surface of the aspheric lens in the second lens group is formed in such a manner that positive power decreases from the central portion of the object-side surface of the aspheric lens toward the periphery of the object-side surface of the aspheric lens, or in such a manner that an inflection point is present between the central portion of the object-side surface of the aspheric lens and the periphery of the object-side surface of the aspheric lens, and that the positive power decreases as a distance from the central portion increases between the central portion and the inflection point, and that negative power increases toward the periphery between the inflection point and the periphery, and
wherein when the refractive index of the aspheric lens in the second lens group for e-line and the Abbe number of the aspheric lens for d-line are Ne5 and vd5, respectively, the following formulas (1) and (2) are satisfied:

$$Ne5 < 1.53 \qquad (1); \text{ and}$$

$$vd5 > 75 \qquad (2).$$

2. A variable magnification optical system, as defined in claim 1, wherein when the paraxial focal length of the aspheric lens in the second lens group is f5 and the focal length of the second lens group is fG2, the following formula (3) is satisfied:

$$1.05 < f5/fG2 < 1.65 \qquad (3).$$

3. A variable magnification optical system, as defined in claim 1, wherein when the refractive index of the negative lens having the concave surface facing the image side of the variable magnification optical system in the second lens group for e-line is Ne8, the following formula (4) is satisfied:

$$Ne8 > 1.95 \qquad (4).$$

4. A variable magnification optical system, as defined in claim 1, wherein when the Abbe number of the positive lens included in the cemented lens of the second lens group for d-line is vd7, the following formula (5) is satisfied:

$$vd7 > 75 \qquad (5).$$

5. A variable magnification optical system, as defined in claim 1, wherein the aperture stop is fixed when the magnification is changed.

6. An imaging apparatus comprising the variable magnification optical system as defined in claim 1.

* * * * *